United States Patent
Sparrow et al.

(10) Patent No.: US 8,727,325 B2
(45) Date of Patent: May 20, 2014

(54) METHOD, APPARATUS AND SYSTEM FOR CONCENTRATING SOLUTIONS USING EVAPORATION

(75) Inventors: Benjamin Stuart Sparrow, Vancouver (CA); Henry Tsin, Richmond (CA); Hojung Kim, Vancouver (CA); Ross Coleman, Vancouver (CA)

(73) Assignee: Saltworks Technologies Inc., Vancouver, British Columbia (CA)

(*) Notice: Subject to any disclaimer, the term of this patent is extended or adjusted under 35 U.S.C. 154(b) by 0 days.

(21) Appl. No.: 13/984,851

(22) PCT Filed: May 24, 2012

(86) PCT No.: PCT/CA2012/000495
§ 371 (c)(1),
(2), (4) Date: Sep. 27, 2013

(87) PCT Pub. No.: WO2012/159203
PCT Pub. Date: Nov. 29, 2012

(65) Prior Publication Data
US 2014/0061958 A1  Mar. 6, 2014

Related U.S. Application Data

(60) Provisional application No. 61/524,166, filed on Aug. 16, 2011, provisional application No. 61/489,545, (Continued)

(51) Int. Cl.
| | |
|---|---|
| *B01F 3/04* | (2006.01) |
| *B01D 1/00* | (2006.01) |
| *B01D 5/00* | (2006.01) |
| *C02F 1/12* | (2006.01) |
| *C02F 103/08* | (2006.01) |

(52) U.S. Cl.
CPC .............. *B01D 1/0011* (2013.01); *B01D 5/003* (2013.01); *B01D 5/0039* (2013.01); *B01D 5/006* (2013.01); *C02F 1/12* (2013.01); *C02F 2103/08* (2013.01)
USPC ....... 261/140.1; 261/146; 261/157; 159/4.01; 159/4.1

(58) Field of Classification Search
CPC ...... B01D 1/0011; B01D 1/007; B01D 1/305; B01D 5/0003; B01D 5/0006; B01D 5/0039; B01D 5/006; C02F 1/12; C02F 2103/08
USPC ........... 261/127, 140.1, 146, 152, 157, 112.1; 159/4.01, 4.1, 13.1
See application file for complete search history.

(56) References Cited

U.S. PATENT DOCUMENTS

| | | | | |
|---|---|---|---|---|
| RE20,469 | E | * | 8/1937 | Crawford ......................... 62/94 |
| 2,535,008 | A | * | 12/1950 | Crawford ...................... 159/4.1 |

(Continued)

FOREIGN PATENT DOCUMENTS

WO      2007128062 A1    11/2007

OTHER PUBLICATIONS

Bourouni, K. et al.: 'Water desalination by humidification and dehumidification of air: state of the art' Desalination vol. 137, 2001, pp. 167-176.

(Continued)

*Primary Examiner* — Charles Bushey
(74) *Attorney, Agent, or Firm* — Troutman Sanders LLP; Ryan A. Schneider

(57) ABSTRACT

The present disclosure is directed at a system, apparatus and method for concentrating a solution. The system includes a humidification device and a solution flow path for flow of a solution to be concentrated to the humidification device. The humidification device includes humidification media to facilitate evaporation of liquid from the solution to be concentrated to gas as the solution to be concentrated passes through the humidification media thereby concentrating the solution. The method includes flowing a solution to be concentrated along a flow path to a humidification device including humidification media, flowing a gas through the humidification media, and flowing the solution to be concentrated through the humidification media. There is evaporation of liquid from the solution to the gas as the solution passes through the humidification media thereby concentrating the solution and producing a humidified gas. The solution to be concentrated may be salt water and the gas may be air.

28 Claims, 11 Drawing Sheets

Related U.S. Application Data filed on May 24, 2011, provisional application No. 61/533,743, filed on Sep. 12, 2011, provisional application No. 61/524,871, filed on Aug. 18, 2011, provisional application No. 61/490,068, filed on May 26, 2011, provisional application No. 61/610,356, filed on Mar. 13, 2012, provisional application No. 61/523,477, filed on Aug. 15, 2011.

(56) References Cited

U.S. PATENT DOCUMENTS

| | | | | |
|---|---|---|---|---|
| 3,367,787 | A | * | 2/1968 | Thijssen et al. ............... 426/492 |
| 3,933,600 | A | * | 1/1976 | Dodge et al. ..................... 203/10 |
| 4,822,455 | A | * | 4/1989 | Olrik ............................. 202/236 |
| 6,919,000 | B2 | * | 7/2005 | Klausner et al. ................ 203/10 |
| 8,252,092 | B2 | * | 8/2012 | Govindan et al. ............... 95/211 |
| 8,292,272 | B2 | * | 10/2012 | Elsharqawy et al. ......... 261/117 |
| 2004/0113291 | A1 | | 6/2004 | Klausner et al. |
| 2013/0118887 | A1 | * | 5/2013 | Frolov et al. ............... 202/185.1 |

OTHER PUBLICATIONS

Prakash Narayan, G. et al.: 'Thermodynamic analysis of humidification dehumidification desalination cycles' Desalination and Water Treatment vol. 16, 2010, pp. 339-353.

International Search Report and Written Opinion for priority application PCT/CA2012/000495, issued Aug. 2, 2012.

Response to Written Opinion and Amendment Under Article 34 filed in the priority application PCT/CA2012/000495 on Oct. 2, 2012.

Notification of Transmittal of IPRP for priority application PCT/CA2012/000495 dated Apr. 22, 2013.

Demand filed in priority application PCT/CA2012/000495 on Oct. 2, 2012.

* cited by examiner

METHOD, APPARATUS AND SYSTEM FOR CONCENTRATING SOLUTIONS USING EVAPORATION

TECHNICAL FIELD

The present disclosure is directed at a method, apparatus and system for concentrating solutions. More specifically, the disclosure is directed a method, apparatus and system for desalinating a saltwater solution using evaporation.

BACKGROUND

Treatment of waste saltwater to reduce volume is becoming increasingly important, particularly for mining, oil and gas, and inland desalination systems. Mines can produce tailings water, which is typically ponded. Oil and gas operations can produce saltwater with the hydrocarbon reserve or during processing. Desalination is being increasingly used in both industries as regulations require treatment of impaired water. Desalination is also used in coastal regions to produce freshwater from seawater, with the more saline brine reject returned to the ocean. Inland brackish water can be desalted, however there is often no convenient way to dispose of the brine reject. Common brine reject management options include discharge to a sewer or the environment, ponding, deep well injection, or treatment to produce solid salt in concentrators and crystallizers. The first two methods are becoming more challenging due to tightening environmental regulations and cost. Concentrators and crystallizers are used to distil water and produce solids, which can then be land filled or put to secondary use, yet they suffer from high capital and energy cost. Capital costs are high due to the extensive use of alloyed steels and titanium required at the operating temperatures and pressures. Energy costs are high due to the use of large volume compressors, which on average consume 20 to 60 kWh of electrical-mechanical power per cubic meter treated. Steam vapour compressors may be used, which consume higher quality steam in place of mechanical power. The cost of brine management is largely proportional to the volume of brine requiring treatment. It is therefore beneficial to devise a plant to treat saltwater to reduce volume and preferably produce solids. Consequently, there is a need for an alternative method and apparatus for concentrating solutions, such as desalinating saltwater.

As saltwater solutions are concentrated, salts can precipitate and scale on various process components. When scaling occurs, performance of the system can quickly diminish. The most common reoccurring maintenance required in any humidification driven saltwater concentrating system is descaling the system components. Therefore, there is also a need to devise a system that efficiently and periodically removes scaling.

SUMMARY

According to a first aspect, there is provided a system for concentrating a solution including a humidification device and a solution flow path for flow of a solution to be concentrated to the humidification device. The humidification device includes humidification media to facilitate evaporation of liquid from the solution to be concentrated to gas as the solution to be concentrated passes through the humidification media thereby concentrating the solution.

The system may include a heater operable to heat the solution to be concentrated to a temperature such that evaporation of liquid from the solution to the gas occurs in the humidification media. The system may also include a gas flow generator for generating gas flow through the humidification media. The gas flow generator may be at least one fan. A pump may be included in the solution flow path operable to pump the solution to be concentrated to the humidification device. The humidification device may include a solution distribution header for distributing the solution to be concentrated onto the humidification media.

The system may include a solution container for the solution to be concentrated. The solution flow path connects the solution container with the humidification device. The solution container may also be in fluid communication with an outlet of the humidification device such that the concentrated solution passes into the solution container. Alternatively, a separate collection container may be included for collection of concentrated solution from the humidification device. The solution container or the collection container may include a body portion and a cone shaped portion configured to funnel the concentrated solution into a solids precipitation area. The solution container or the collection container may also include an inlet for the concentrated solution and a deflection plate positioned beneath the inlet and above the solids precipitation area, such that the concentrated solution entering the solution container or the collection container is deflected away from solids precipitating in the solids precipitation area.

The system may include a solids collection assembly for collecting solids precipitated in the solids precipitation area. The solids collection assembly may include a motorized filter belt configured to receive precipitated solids from the solids precipitation area. The filter belt includes a material with a plurality of pores therethrough, the plurality of pores sized to permit solution to pass through the material while capturing the precipitated solids on the filter belt. Alternatively, the solids collection assembly may be an auger assembly. The auger assembly includes an auger positioned within an auger housing, a motor for rotating the auger within the auger housing, an auger inlet positioned in the solids precipitation area to collect precipitated solids, and an auger outlet for releasing precipitated solids. The auger is inclined such that the auger outlet is positioned vertically higher than the auger inlet. The auger assembly may also include an auger cooling circuit whereby coolant is used to cool the precipitated solids passing along the auger and is heated in the process. The auger cooling circuit includes a coolant inlet, a coolant outlet, a coolant pump for circulating the coolant from the coolant outlet to the coolant inlet, and a coolant heat exchanger for removing heat from the coolant before the coolant enters the coolant inlet. The auger assembly may also include a coolant refrigeration circuit for cooling the coolant before it enters the coolant inlet. The coolant refrigeration circuit includes an evaporator, a compressor, a condenser, and an expansion device. The coolant heat exchanger includes the evaporator configured to transfer heat from the coolant to a refrigerant within the evaporator such that the refrigerant evaporates, the compressor is configured to compress the evaporated refrigerant, the condenser is configured to condense the compressed refrigerant and transfer the heat of condensation of the refrigerant to the solution to be concentrated before the solution to be concentrated enters the humidification device, and the expansion device is configured to expand the compressed refrigerant before the refrigerant enters the evaporator.

The system may include a dehumidification device in gas flow communication with the humidification device such that humidified gas flows from the humidification device to the dehumidification device. The dehumidification device is operable to condense vapour from the humidified gas. The heat of condensation of the vapour may be transferred to a heat recovery circuit. The heat recovery circuit may include a heat recovery evaporator, a heat recovery compressor, a heat recovery condenser, and heat recovery expansion device. The dehumidification device includes the heat recovery evaporator configured to transfer heat generated by condensing vapour from the humidified gas to a heat recovery refrigerant within the heat recovery evaporator such that the heat recovery refrigerant evaporates, the heat recovery compressor is configured to compress the evaporated heat recovery refrigerant, the heat recovery condenser is configured to condense the compressed heat recovery refrigerant and transfer the heat of condensation of the heat recovery refrigerant to the solution to be concentrated before the solution to be concentrated enters the humidification device, and the heat recovery expansion device is configured to expand the compressed heat recovery refrigerant before the heat recovery refrigerant enters the heat recovery evaporator. The system may include a duct connecting a gas outlet from the dehumidification device with a gas inlet into the humidification device. The duct may include a closable outlet vent for controlled release of dehumidified gas from the duct as required and a closable inlet vent for controlled input of external gas into the duct as required. The duct may also include an internal closable return vent for controlled recirculation of the dehumidified gas through the duct as required and an internal closable inlet vent for controlled introduction of the dehumidified gas into the humidification device as required.

The system may include a cleaning circuit for flushing a cleaning solution through at least part of the solution flow path. The cleaning circuit includes a cleaning solution container for cleaning solution, and a closable outlet flow path fluidly connecting the cleaning solution container with the solution flow path for controllable flow of cleaning solution from the cleaning solution container through at least part of the solution flow path. The outlet flow path may be closable by a one way valve. The cleaning circuit may also include a closable return flow path fluidly connecting the solution flow path with the cleaning solution container for return flow of cleaning solution to the cleaning solution container. The return flow path may be closable by a one way valve. The cleaning circuit may include a heater for heating the cleaning solution. The system may include one or more sensors for sensing process conditions of the system that indicate a build up of solids in the solution flow path to provide an indication that the cleaning circuit needs to be activated. The cleaning circuit may include a humidification media flow path from the cleaning solution container to a plurality of cleaning solution nozzles directed at the humidification media for spraying cleaning solution onto the humidification media. The humidification media flow path may include a controllable pump for pumping the cleaning solution to the plurality of cleaning solution nozzles when required.

According to another aspect, the system may include a first solution concentrating circuit and a second solution concentrating circuit. The first solution concentrating circuit includes a first humidification device including a first humidification media, a first dehumidification device in gas flow communication with the first humidification device, a first solution flow path for flow of a first solution to be concentrated to the first humidification device, the first humidification media facilitating evaporation of liquid from the first solution to be concentrated to a first gas as the first solution to be concentrated passes through the first humidification media thereby concentrating the first solution and producing a first humidified gas. The second solution concentrating circuit includes a second solution container, a second humidification device including a second humidification media, a second solution flow path for flow of a second solution to be concentrated to the second humidification device, the second humidification media facilitating evaporation of liquid from the second solution to be concentrated to a second gas as the second solution to be concentrated passes through the second humidification media thereby concentrating the second solution and producing a second humidified gas. The first dehumidification device includes a condensing heat exchanger in the second solution flow path such that the second solution to be concentrated passes internal the condensing heat exchanger and is heated by heat generated from condensation of vapour from the first humidified gas on the external surface of the condensing heat exchanger. The condensing heat exchanger heats the second solution to be concentrated before the second solution to be concentrated enters the second humidification device.

A first duct may connect a first gas outlet from the first dehumidification device with a first gas inlet into the first humidification device. The first duct may include a first closable outlet vent for controlled release of the first dehumidified gas from the first duct as required and a first closable inlet vent for controlled input of external gas into the first duct as required. The first duct may also include a first internal closable return vent for controlled recirculation of the first dehumidified gas through the first duct as required and a first internal closable inlet vent for controlled introduction of the first dehumidified gas into the first humidification device as required.

A second dehumidification device may be included in gas flow communication with the second humidification device, such that the second humidified gas flows from the second humidification device to the second dehumidification device. The second dehumidification device is operable to condense vapour from the second humidified gas. A heat recovery circuit may be included to recover heat of condensation from the second dehumidification device. The heat recovery circuit includes a heat recovery evaporator, a heat recovery compressor, a heat recovery condenser and a heat recovery expansion device, and the second dehumidification device includes the heat recovery evaporator configured such that heat generated from condensation of vapour from the second humidified gas is transferred to a heat recovery refrigerant within the heat recovery evaporator to evaporate the heat recovery refrigerant, the heat recovery compressor is configured to compress the evaporated heat recovery refrigerant, the heat recovery condenser is configured to condense the compressed heat recovery refrigerant and transfer the heat of condensation of the heat recovery refrigerant to the first solution to be concentrated before the first solution to be concentrated enters the first humidification device, and the heat recovery expansion device is configured to expand the compressed heat recovery refrigerant before the heat recovery refrigerant enters the heat recovery evaporator. A second duct may connect a second gas outlet from the second dehumidification device with a second gas inlet into the second humidification device. The second duct may include a second closable outlet vent for controlled release of the second dehumidified gas from the second duct as required and a second closable inlet vent for controlled input of external gas into the second duct as required. The second duct may also include a second internal closable return vent for controlled recirculation of the second dehumidified gas through the second duct as required and a second internal closable inlet vent for controlled introduction of the second dehumidified gas into the second humidification device as required.

The system may include one or more additional solution concentrating circuits positioned between the first and second solution concentrating circuits such that solution to be concentrated in an additional circuit is heated in a condensing heat exchanger of a dehumidification device of an upstream solution concentrating circuit before the solution to be concentrated enters a humidification device in the additional circuit.

According to another aspect, there is provided a method of concentrating a solution including flowing a solution to be concentrated along a flow path to a humidification device including humidification media, flowing a gas through the humidification media, and flowing the solution to be concentrated through the humidification media, such that there is evaporation of liquid from the solution to the gas as the solution passes through the humidification media thereby concentrating the solution and producing a humidified gas. The solution to be concentrated may be salt water and the gas may be air. The method may include precipitating solids from the concentrated solution and collecting the precipitated solids.

The method may include heating the solution to be concentrated before the solution to be concentrated enters the humidification device. The solution to be concentrated may be heated to a temperature greater than the wet bulb temperature of the gas flowing through the humidification media. The solution to be concentrated may be heated to a temperature that is at or below ambient temperature.

The method may include controlling the temperature of gas flowing through the humidification media. The temperature of gas flowing through the humidification media may be controlled by controlling the flow of the solution to be concentrated through the humidification media and/or controlling the flow of the gas through the humidification media.

The method may include periodically flushing cleaning solution through at least part of the flow path to de-scale the flow path. The cleaning solution may be flushed through at least part of the flow path at or after system shutdown. The cleaning solution may be flushed through at least part of the flow path during operation when increased pump load is detected. The method may also include sensing process conditions using one or more sensors and flushing cleaning solution through at least part of the flow path when the sensors indicate a build up of solids in the solution flow path. The cleaning solution may be heated prior to entering the flow path. The method may also include periodically flushing cleaning solution through the humidification media to de-scale the humidification media. The cleaning solution may be heated prior to flushing the humidification media.

The method may include flowing the humidified gas through a dehumidification device in gas flow communication with the humidification device and condensing vapour from the humidified gas in the dehumidification device to produce a liquid and a dehumidified gas. The heat of condensation from the step of condensing vapour from the humidified gas may be recovered and used for heating the solution to be concentrated before the solution to be concentrated enters the humidification device. The heat of condensation may be recovered by transferring the heat of condensation from the step of condensing vapour from the humidified gas to a refrigerant within an evaporator to evaporate the refrigerant, compressing the evaporated refrigerant in a compressor, condensing the compressed refrigerant in a condenser and transferring the heat of condensation of the refrigerant to the solution to be concentrated, and expanding the compressed refrigerant in an expansion device before the refrigerant enters the evaporator. The temperature difference between the condenser and the evaporator may be minimized within pre-defined allowable operating ranges. The compressor may be operated at a predefined minimum pressure difference across the compressor. The method may include monitoring the temperature of the solution to be concentrated and the condensing refrigerant in the condenser, calculating a heat transfer coefficient from heat load (kW) divided by the product of temperature difference and heat exchange surface area (deg C m2), and if there is an increase in heat transfer coefficient above a threshold then initiating flushing of the condenser with cleaning solution. The method may include flowing the dehumidified gas released from the dehumidification device to the humidification device through a duct connecting a gas outlet of the dehumidification device with a gas inlet of the humidification device. The method may further include controlling the temperature of the gas flowing through the humidification media by reducing or increasing discharge of the dehumidified gas from the duct by closing or opening at least one closable vent in the duct.

According to another aspect, the method may include flowing a first solution to be concentrated along a first flow path to a first humidification device including first humidification media; flowing a first gas through the first humidification media; flowing the first solution to be concentrated through the first humidification media, such that there is evaporation of liquid from the first solution to the first gas as the first solution passes through the first humidification media thereby concentrating the first solution and producing first humidified gas; flowing the first humidified gas through a first dehumidification device in gas flow communication with the first humidification device; flowing a second solution to be concentrated through a condensing heat exchanger in the first dehumidification device to a second humidification device including second humidification media, whereby heat generated from condensation of vapour from the first humidified gas on an external surface of the condensing heat exchanger is transferred to the second solution flowing through the condensing heat exchanger to heat the second solution before the second solution enters the second humidification device; flowing a second gas through the second humidification media; and flowing the second solution to be concentrated through the second humidification media, such that there is evaporation of liquid from the second solution to the second gas as the second solution passes through the second humidification media thereby concentrating the second solution and producing second humidified gas.

The method may include flowing a first dehumidified gas released from the first dehumidification device to the first humidification device through a first duct connecting a first gas outlet of the first dehumidification device with a first gas inlet of the first humidification device. The method may further include controlling the temperature of the first gas flowing through the first humidification media by reducing or increasing discharge of the first dehumidified gas from the first duct by closing or opening at least one closable first vent in the first duct.

The method may further include flowing the second humidified gas through a second dehumidification device in gas flow communication with the second humidification device and condensing vapour from the second humidified gas in the second dehumidification device to produce a second liquid and a second dehumidified gas. Heat of condensation from the step of condensing vapour from the humidified gas may be recovered and used for heating the first solution to be concentrated before the first solution to be concentrated enters the first humidification device. Recovering the heat of condensation may include transferring the heat of condensation from the step of condensing vapour from the second humidified gas to a refrigerant within an evaporator to evaporate the refrigerant, compressing the evaporated refrigerant in a compressor, condensing the compressed refrigerant in a condenser and transferring the heat of condensation of the refrigerant to the first solution to be concentrated, and expanding the compressed refrigerant in an expansion device before the refrigerant enters the evaporator. The temperature difference between the condenser and the evaporator may be minimized within predefined allowable operating ranges. The compressor may be operated at a predefined minimum pressure difference across the compressor. The method may include monitoring the temperature of the first solution to be concentrated and the condensing refrigerant in the condenser, calculating a heat transfer coefficient from heat load (kW) divided by the product of temperature difference and heat exchange surface area (deg C m2), and if there is an increase in heat transfer coefficient above a threshold then initiating flushing of the condenser with cleaning solution. The method may further include monitoring and controlling temperature difference between the temperature of the second solution flowing through the condensing heat exchanger and the temperature of the refrigerant flowing through the evaporator. The method may include flowing the second dehumidified gas released from the second dehumidification device to the second humidification device through a second duct connecting a second gas outlet of the second dehumidification device with a second gas inlet of the second humidification device. The method may further include controlling the temperature of the second gas flowing through the second humidification media by reducing or increasing discharge of the second dehumidified gas from the second duct by closing or opening at least one closable second vent in the second duct.

According to another aspect, there is provided an apparatus for use in a solution concentrating system. The apparatus includes a humidification device including humidification media, the humidification media facilitating evaporation of liquid from a solution to a gas as the solution passes through the humidification media thereby concentrating the solution and producing a humidified gas; and a dehumidification device in gas flow communication with the humidification device such that the humidified gas flows from the humidification device to the dehumidification device. The dehumidification device is operable to condense vapour from the humidified gas.

The apparatus may further include a heat recovery circuit including an evaporator, a compressor, a condenser, and an expansion device. The dehumidification device includes the evaporator configured to transfer heat generated by condensing vapour from the humidified gas to a refrigerant within the evaporator such that the refrigerant evaporates, the compressor is configured to compress the evaporated refrigerant, the condenser is configured to condense the compressed refrigerant and transfer the heat of condensation of the refrigerant to the solution before the solution enters the humidification device, and the expansion device is configured to expand the compressed refrigerant before the refrigerant enters the evaporator.

The apparatus may further include a duct connecting a gas outlet from the dehumidification device with a gas inlet into the humidification device. The duct may include a closable outlet vent for controlled release of dehumidified gas from the duct as required and a closable inlet vent for controlled input of external gas into the duct as required. The duct may further include an internal closable return vent for controlled recirculation of the dehumidified gas through the duct as required and an internal closable inlet vent for controlled introduction of the dehumidified gas into the humidification device as required.

BRIEF DESCRIPTION OF THE DRAWINGS

In the accompanying drawings, which illustrate one or more exemplary embodiments.

DETAILED DESCRIPTION

Figure 1:
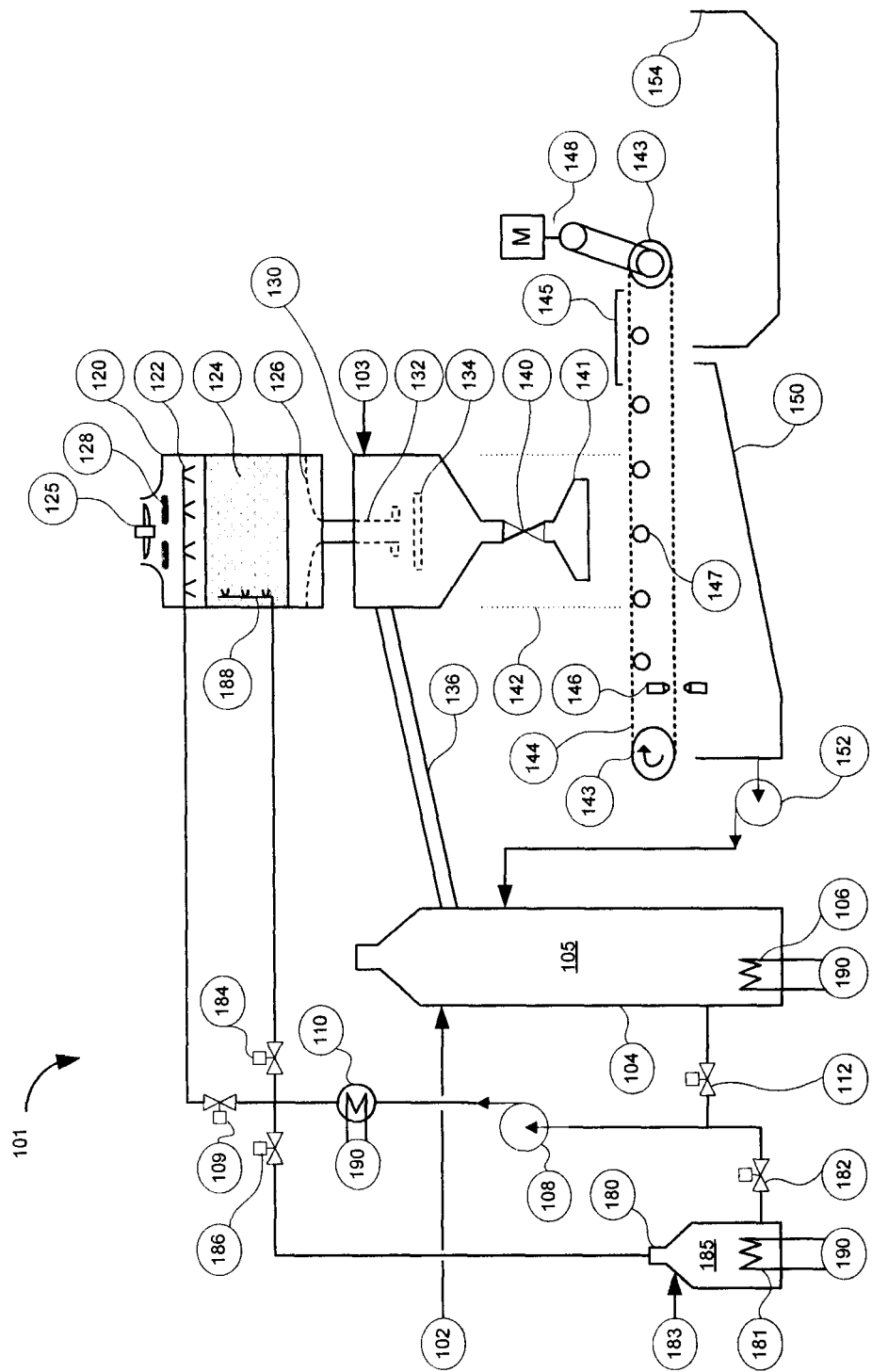
FIG. 1 is a schematic view of a solution concentration system according to an embodiment.

Directional terms such as "top", "bottom", "upwards", "downwards", "vertically" and "laterally" are used in the following description for the purpose of providing relative reference only, and are not intended to suggest any limitations on how any article is to be positioned during use, or to be mounted in an assembly or relative to an environment.

The embodiments described herein concentrate solutions and produce a low volume concentrated solution or solid discharge at a reduced cost and lower energy consumption. The embodiments are generally directed at concentration of a salt solution to produce concentrated saltwater and/or solid salt and desalinated water, however, any solution can be concentrated using the methods and systems of the embodiments described. Liquid, such as water, is removed from the solution by evaporation to gas; solids, such as salts, may be precipitated, collected and then purged from the system. The embodiments described herein are generally directed to the gas being air, however other gases may be used, for example methane, helium, hydrogen, or nitrogen with differing heat capacities that will provided different thermal and capacity performance. The system may operate near atmospheric pressure and temperature, enabling construction of parts from plastics as opposed to more expensive corrosion resistant steels. Materials of construction such as polyethylene or polypropylene may be beneficially used for their smooth surfaces and reduced likelihood of solid adhesion. All surfaces are designed for smooth transitions to prevent solid accumulation in crevices. The system is configured and temperature gradients controlled to prevent precipitation in detrimental locations while encouraging precipitation in desired locations.

The embodiments described herein are directed at a system for concentrating a solution. The system includes a humidification device and a solution flow path for flow of the solution to be concentrated to the humidification device. The humidification device includes humidification media, which is any media or packing that facilitates evaporation of liquid from the solution to gas as the solution passes through the humidification media and may include, but is not limited to, cooling tower splash fill or film fill packing and may be constructed from corrosion and scale resistant materials such as polyvinyl chloride, polypropylene or polyethylene. The humidification device may be an evaporative tower, a cooling tower, or other device which facilitates evaporation of liquid to gas as the solution passes through the device. The humidification device may be constructed from non-corrosive fibreglass shell, plastic packing materials such as polyvinyl chloride or polyethylene, and alloyed steel or stainless steel hardware to prevent corrosion issues. The humidification device may include a solution distribution header for distributing solution to be concentrated onto the humidification media.

The system may include a solution container for the solution to be concentrated. The solution container may also be configured to receive concentrated solution from the humidification device. In alternative embodiments, the solution to be concentrated may be feed directly into the solution flow path or the solution flow path may be in fluid communication with a reservoir or pond of saltwater. The solution flow path may include a heater, such as a heat exchanger, operable to heat the solution to be concentrated to a temperature such that evaporation of liquid from the solution to the gas occurs in the humidification media. The heater may heat the solution to be concentrated to a temperature that is greater than the wet bulb temperature of the gas flowing through the humidification media. The solution flow path may include a pump operable to pump the solution to be concentrated to the humidification device.

The system may also include a gas flow generator for generating gas flow through the humidification media. In the embodiments described herein, the gas flow generator is at least one fan, however in alternative embodiments, other gas flow generators may be used, such as a blower or exhauster. The fan may be positioned in or adjacent the humidification device. The system may include a "clean-in-place" system or cleaning circuit to periodically wash and de-scale parts of the system, such as the pump, heater and humidification media.

In one embodiment solids, such as salt, are harvested from a solid precipitation area by periodically purging a mixture of solids and liquids through an actuated purge valve onto on a filter belt. Solids larger than the belt pores accumulate on the belt, while smaller solids and liquids pass through the belt to a collection basin below. Belt movement is coordinated with purge valve actuation to complete three operations: drying time, dropping into a collection bin, and belt cleaning. In another embodiment, precipitated solids may be collected using an auger assembly. Optional crystallization seeds, such as calcium sulfate, may be injected into the system to provide a nucleation site and encourage precipitation.

The embodiments described herein are also directed to a method of concentrating a solution including flowing a solution to be concentrated along a flow path to a humidification device including humidification media, flowing a gas through the humidification media, and flowing the solution to be concentrated through the humidification media, such that there is evaporation of liquid from the solution to the gas as the solution passes through the humidification media thereby concentrating the solution and producing a humidified gas. The flow path may be in fluid communication with a solution container or reservoir containing the solution to be concentrated or the solution to be concentrated may be feed directly into the solution flow path. The embodiments described herein are generally directed to concentrating a salt water solution using air flowing the humidification media, however, any solution can be concentrated using the method and other gases may be used, for example methane, helium, hydrogen, or nitrogen with differing heat capacities that will provided different thermal and capacity performance.

The method may also include heating the solution to be concentrated before the solution to be concentrated enters the humidification device. The solution to be concentrated may be heated to a temperature greater than the wet bulb temperature of the gas flowing through the humidification media. For example, but not limited to, the solution to be concentrated may be heated to a temperature that is at least 1 deg C., or at least 2 deg C., or at least 3 deg C., or at least 4 deg C., or at least 5 deg C., or at least 6 deg C., or at least 7 deg C., or at least 8 deg C., or at least 9 deg C., or at least 10 deg C. greater than the wet bulb temperature of the gas flowing through the humidification media. In alternative embodiments, the solution to be concentrated may be heated to a temperature that is between 1 deg C. and 15 deg C. greater than the wet bulb temperature of the gas flowing through the humidification media or any range in between, for example, between 1 deg C. and 10 deg C., between 5 deg C. and 10 deg C. or any temperature in between, such as 1 deg C., 2 deg C., 3 deg C., 4 deg C., 5 deg C., 6 deg C., 7 deg C., 8 deg C., 9 deg C., 10 deg C., 11 deg C., 12 deg C., 13 deg C., 14 deg C., 15 deg C.

Referring to FIG. 1, there is shown a solution concentration system 101, which consists of three sub-systems:

Solution concentrating circuit: removes water from the system via evaporative tower 120 and associated parts;

Clean-in-place circuit: periodically de-scales and cleans main pump 108, heat exchanger 110, and evaporative tower packing 124;

Solids harvesting circuit: separates solids from liquids using filter belt 144 and associated parts.

The solution concentrating circuit accepts input solution to be concentrated such as saltwater 102 from an upstream process into bulk tank 104, mixing with the bulk salt solution 105. Bulk tank 104 may include an optional heater element 106 supplied with heat source 190 to warm the bulk salt solution prior to pumping in order to reduce the likelihood of precipitation in downstream process pipework. Bulk salt solution 105 exits bulk tank 104 via a bulk tank outlet and passes through a normally open bulk tank valve 112. The bulk tank outlet may be positioned at least 15 cm above the tank base to prevent egress of solids that may accumulate in the base of the tank. The clean-in-place tank valve 182 is normally closed. Main pump 108 pumps the salt solution through heat exchanger 110. The main pump 108 may be designed to handle some solids such as an open face impeller, however alternative pumps may be used. Exemplar heat exchangers include polyethylene pipe-in-pipe or titanium plate and frame. Low grade heat from heat source 190 is applied to the hot side of the heat exchanger in order to warm the salt solution temperature higher than the wet bulb temperature of the air passing through evaporator tower 120. The warm salt solution passes through the normally open evaporative tower input valve 109 prior to entering the evaporative tower packing distribution header 122. The clean-in-place recirculation valve 186 and evaporative tower packing spray valve 184 are normally closed.

Warm salt solution is released by evaporative tower packing distribution header 122 and drips through the evaporative tower packing 124 which maximizes mass transfer of water to air. The salt solution then passes into the smooth bottomed collection basin 126, which may have a small retained volume to minimize heat loss of the retained solution to atmosphere. Fan 125 moves air through the evaporative tower packing 124. A demister 128 may be provided to remove carryover droplets from the air.

Water is removed from the salt solution as it passes through the evaporative tower, with the rate of evaporation roughly proportional to the temperature difference between the inlet salt solution and wet bulb temperature of the air. Vaporization of water cools the salt solution, as well as concentrates it. The cooled, concentrated salt solutions passes into a collection cone tank 130 via conduit 132. A deflection plate 134 may be mounted under, but a distance from, the exit of conduit 132. The deflection plate 134 beneficially prevents disturbance of the salt collecting in the base of the cone tank 130. If the salt solution reaches saturation due to the removal of water and cooling, salts will form. Heavier salt particles fall to the base while the lower density and less saturated solution rises and exits through conduit 136 to return to bulk tank 104. The system is designed for temperature stratification and hydraulics such that salts form in the cooler, stiller, base of cone tank 130 while salt formation is substantially prevented in the warmer bulk tank 104.

Precipitation in cone tank 130 may be encouraged through addition of crystal seeds 103, such as calcium sulfate seeds, which provide nucleation sites for salt crystal growth. The cone tank 130 is periodically purged of the precipitated salts collecting in the bottom, along with some solution through actuated valve 140. Actuated valve 140 may be a butterfly valve with a rubber seat for reliable operation, however ball or diaphragm valves or other valves could also be employed. An optional distributor 141 directs the exiting salt-solution mixture to filter belt 144.

Filter belt 144 consists of a robust material with pore sizes small enough to capture the salts in question but to also allow gravity drainage of solution through to collection basin 150. The salt solution in basin 150 can be pumped back to the bulk tank 104 using basin pump 152. The collection basin 150 may include an optional heater element (not shown) to reduce the likelihood of precipitation in pump 152 and its associated pipework. Exemplar filter belts include, but are not limited to, Clear Edge Filtration's PX60™ filter belt. Filter belt 144 may optionally be supported with a series of rollers 147 and bearings. The rollers 147 may be plastic, for example HDPE, and the bearings may be PTFE pillow block bearings. The belt may be moved by a drive system 148 using exemplar silicon coated stainless steel rollers 143 to provide traction drive. The stainless steel rollers 143 are kept well away from the saltwater splash zone to prevent corrosion.

Filter belt movement may be timed and coordinated with the actuated valve 140 as follows:
1. Belt stationary during cone tank 130 purge and solution gravity filtering;
2. Move belt using drive system 148 to drying zone 145 and stop;
3. During belt movement in step 2 solids collected in previous purge and passed through the drying zone 145 are discharged from the end of the belt 144 into collection bin 154, from where they are subsequently disposed;
4. Also during belt movement in step 2 belt washer may be initiated to spray the belt with clean-in-place solution 185 via high pressure low flow nozzles 146, removing encrusted solids; and
6. Purge cone tank 130 again after belt stop and repeat steps 2 to 4.

The system may include an optional shield 142 to prevent saltwater splash-out. An exemplar shield 142 could be Plexiglas, providing the benefits of corrosion resistance and transparency for operators to troubleshoot machine operation. The clean-in-place system may also include plumbing to optional nozzles spraying bearings or accumulation points. It is beneficial to minimize the volume of clean place solution 185 sprayed in order to minimize the amount of water added to the system. The drying zone 145 may be exposed to ambient and solar energy in appropriately dry climates, or enclosed and equipped with forced air and/or heaters to assist drying.

In alternative embodiments (not shown) a filter press or centrifuge is utilized to separate solids and liquids in place of the filter belt system. A filter press or centrifuge would accept a solids-solution mixture from valve 140, separate the solids for disposal, and return the solution to the saltwater concentrating circuit via a pump similar in intent to basin pump 152.

The clean-in-place system periodically circulates clean-in-place solution 185 through main pump 108 and heat exchanger 110 to de-scale them. The clean-in-place system may also spray clean-in-place solution 185 to clean belt 144 and evaporative tower packing 124. The clean-in-place solution 185 may be fresh water due to its solubility action, but could also be saltwater or other solution. The clean-in-place solution 185 may be heated with element 181 in tank 180 via heat supply 190 in order to increase its de-scaling capability. The clean-in-place solution 185 may have acid, base, or anti-scalants added to increase de-scaling capability, depending on the composition of the salt water being processed. If for example the salt water is high in silica, the pH of the clean-in-place solution 185 may be increased to encourage silica de-scaling, while if the salt water is high in carbonates, the pH of the clean-in-place solution 185 may be reduced.

Operation of the clean-in-place system may be based on one or more of the following criteria:
  A timer set to predetermined operational needs;
  Increase pump load or vibration;
  Reduced heat transferred determined as decreased heat transfer coefficient calculated through means known to those skilled in the air based on thermal load and temperature differences between the heat source 190 and saltwater being heated;
  Increase evaporative tower fan 125 load indicating packing scaling.

Pump and heat exchanger clean-in-place operation involves shutting down the evaporation circuit by closing valves 112 and 109, and opening valves 182 and 186, with valve 184 initially remaining closed. This action will circulate the clean-in-place solution 185 through the main pump 108 and heat exchanger 110, thereby providing some degree of de-scaling as built-up salts re-dissolve into solution. The clean-in-place solution 185 is circulated back to tank 180 until a set period of time has passed to allow for cleaning. Tower packing 124 can be cleaned immediately after, or any time as required, by maintaining valves 112 and 109 closed and 182 open, opening valve 184 and closing valve 186; thereby diverting clean-in-place solution 185 to the evaporative tower packing cleaning spray nozzles 188. The evaporative tower packing cleaning spray nozzles 188 direct warm clean-in-place solution 185 at a high pressure and low flow rate at the packing surface to remove attached scale. A minimal amount of water is beneficially added to the system, since all water added needs to be subsequently removed and as a result the addition of water decreases the plant's net water processing capacity. Make-up clean-in-place solution 183 can be added to the clean-in-place tank 180 optionally using an actuated valve or float valve. Valves 112, 182, 184, 186, and 109 may be automatically actuated in accordance with the above mentioned operation criteria and position instructions through use of common air or electric valve actuation systems (not shown).

In the embodiment described above, which is open to atmosphere, the solution concentrating circuit removes moisture by evaporation to air and thereby concentrates the salt solution. In order to maintain evaporation however, heat must be supplied. Without heat supply, the system will cool to the wet bulb temperature of the air and evaporation will cease. The heat supplied need only be sufficient to warm the salt solution to a temperature about 1 to 10 deg C. warmer than the wet bulb temperature of the air. For example, at an ambient temperature of 30 deg C. and relative humidity of 39%, the wet bulb temperature is 20 deg C., therefore the salt solution need only be heated to 30 deg C. (near ambient) prior to entering the evaporative tower packing distribution header 122. Although the quality of heat supplied is low, owing to its low temperature, the quantity can be quite large due to the high latent heat of vaporization of water (approximately 2400 kJ/kg near 30 deg C.). In addition, the vapour evaporated from the salt solution represents near-pure water lost from the system. It is therefore beneficial to devise a system that captures and recycles heat as well as condenses water from evaporative tower warm moist air exhaust.

In an alternative embodiment a portion of the heat of vaporization lost during evaporation to the atmosphere is recycled and used to heat the solution to be concentrated before it enters the evaporative tower. This is achieved by ducting the warm, moist exhaust of the evaporative tower over a heat pump evaporator. The heat pump upgrades heat from condensing evaporative tower exhaust moisture to heat the evaporative tower feed solution. Beneficially, low grade heat energy is reduced or removed completely, reducing the need for an external low grade heat source.

The heat pump will require higher grade mechanical energy to drive the heat pump compressor. However heat pumps provide a coefficient of performance (COP) effect, resulting in a COP multiple of units heat energy upgraded per unit of mechanical energy used to drive the heat pump compressor. For example, with heat pump COP of three: three units of heat energy will be upgraded for each unit of mechanical energy input to the heat pump compressor resulting in a total of four units of heat energy being added to the saltwater (three units from the evaporator and one unit from the compressor). In sum, a smaller portion of high grade energy is used by the heat pump to recycle and upgrade heat content from the warm moist evaporative tower exhaust for re-input into the warmer evaporative tower input solution, thereby reducing or removing the need for an external heat supply.

Figure 2:
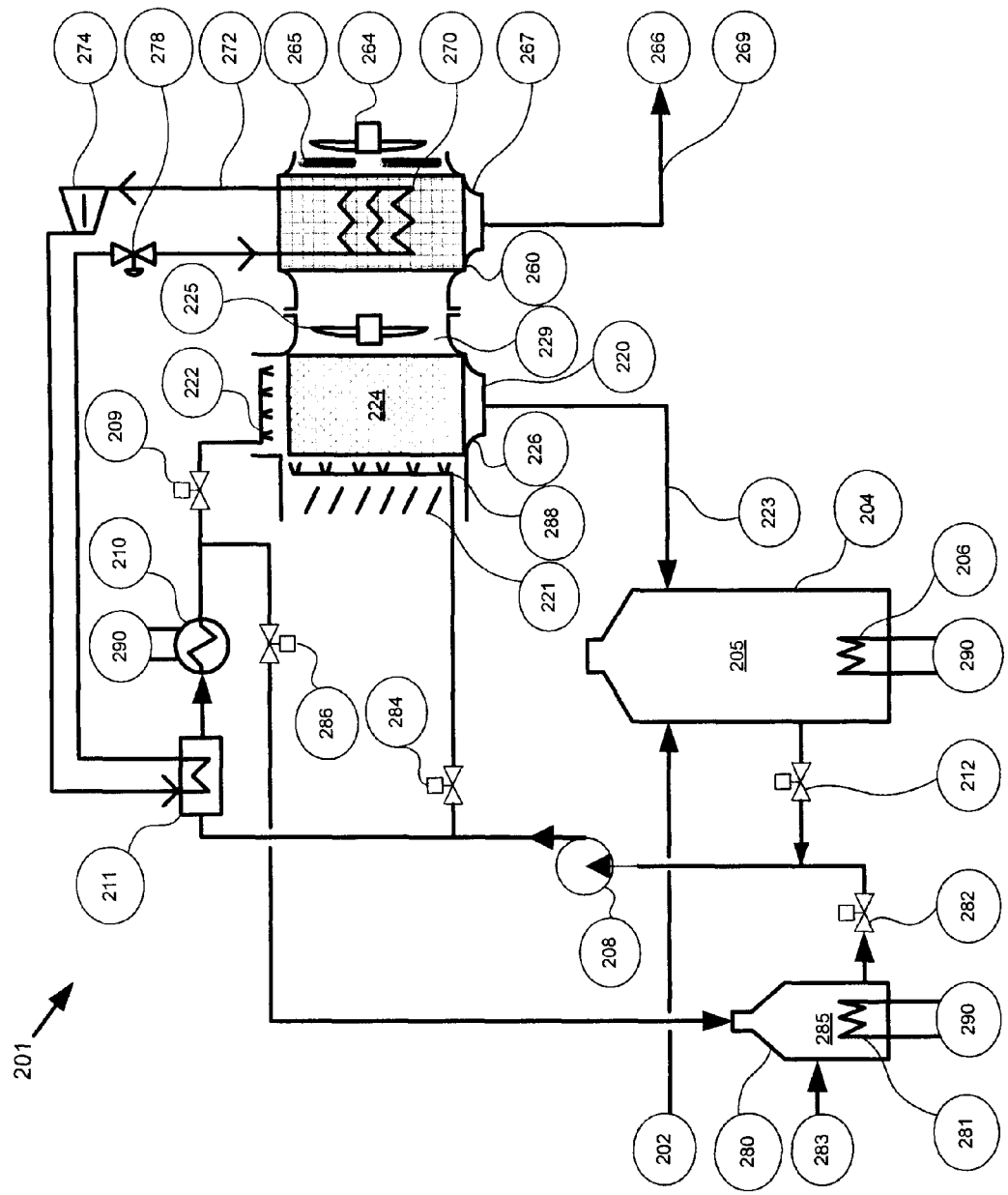
FIG. 2 is a schematic view of a heat recovery and condensed water production solution concentrating system according to an embodiment.

Referring to FIG. 2, there is shown a heat recovery and condensed water production solution concentrating system 201, which includes three sub-systems:

Solution concentrating circuit: removes water from the system via evaporative tower 220 and associated parts;

Heat pump circuit: captures heat from evaporative tower warm moist air exhaust 229 and upgrades it to heat the solution entering the evaporative tower 220;

Optional clean-in-place circuit: periodically de-scales and cleans main pump 208, heat exchangers 210, 211 and evaporative tower packing 224;

The solution concentrating circuit accepts make-up solution, such as saltwater 202, from an upstream process into bulk tank 204. Bulk tank 204 may include an optional heater element 206 supplied with heat source 290, which warms bulk salt solution 205 prior to pumping and beneficially reduces the likelihood of precipitation in downstream process pipework. Bulk salt solution 205 exits bulk tank 204 via an outlet and passes through a normally open bulk tank valve 212. The outlet may be positioned at least 15 cm above the tank base to prevent egress of solids that may accumulate in the base of the tank. Optional clean-in-place tank valve 282 is normally closed. Main pump 208 pumps the salt solution 205 through a heat pump condenser heat exchanger 211 and main heat exchanger 210.

The objective of both heat exchangers 210 and 211 is to warm the salt solution temperature to approximately 5 deg C. higher than the wet bulb temperature of the surrounding air, which will promote evaporation of water to atmosphere in evaporative tower 220 and thereby concentrate the salt solution 205. The heat pump condenser heat exchanger 211 beneficially reduces, or removes completely, the quantity of low grade heat from heat source 290 that needs to be applied to the hot side of the main heat exchanger 210.

The warm salt solution exiting main heat exchanger 210 passes through the normally open evaporative tower input valve 209 prior to entering the evaporative tower packing distribution header 222. The optional clean-in-place recirculation valve 286 and evaporative tower packing spray valve 284 are normally closed. The warm salt solution passes through the evaporative tower packing distribution header 222 and drips through the evaporative tower packing 224 while fan 225 moves air through the evaporative tower packing, promoting mass transfer of water to air. Evaporative tower inlet louvers 221 direct air into the evaporative tower packing and prevent splashing of saltwater out of the evaporative tower air inlet when the fan 225 is not on. Water evaporates from the salt solution 205 to the air if the salt solution temperature is higher than the wet bulb temperature of the air. As a result, warm moist air exhaust 229 is produced while the salt solution 205 is cooled through loss of heat of vaporization and concentrated through loss of water. The cooled, concentrated salt solution collects in collection basin 226 and returns to the bulk tank 204 through conduit 223, which may include an optional strainer or filter (not shown) to remove any debris. The evaporative tower 220 may be similar in construction to a cooling tower; however the evaporative tower 220 may be constructed from non-corrosive fibreglass shell, plastic packing materials such as polyvinyl chloride or polyethylene, and alloyed steel or stainless steel hardware to prevent corrosion issues.

The evaporative tower moist air exhaust 229 passes through to dehumidifying device 260 under action of an optional fan 264. Fan 264 may be optionally removed if evaporated tower fan 225 is sufficiently sized to induce the required air flow. The dehumidifying device 260 includes a heat pump refrigerant evaporator 270. Inside the heat pump refrigerant evaporator 270 refrigerant evaporates at a temperature lower than the wet bulb temperature of the air plus an additional margin to allow for heat transfer resistance. As a result, water vapour condenses from the evaporative tower moist air exhaust 229 in contact with the external surface of the heat pump refrigerant evaporator 270. As water vapour condenses, the latent heat of condensation is transferred to the refrigerant inside the heat pump refrigerant evaporator 270.

Low pressure refrigerant gas passes from the heat pump refrigerant evaporator 270 to heat pump compressor 274. Heat pump compressor 274 compresses the refrigerant gas to a sufficient pressure that will enable condensation of high pressure refrigerant gas in the heat pump condenser heat exchanger 211 at a temperature greater than the salt solution 205 inside the heat exchanger 211. This results in condensation of the refrigerant inside the tubes of the heat pump condenser heat exchanger 211. Condensed liquid refrigerant passes through an expansion device 278 which lowers the pressure from the high to the low pressure side of the heat pump cycle allowing low pressure refrigerant to enter the evaporator. Condensing refrigerant in heat exchanger 211 transfers the refrigerant's latent heat of condensation to heat the salt solution 205 before it enters the evaporative tower 220. Beneficially, the net result is that the latent heat from the condensing exhaust moist air 229 in contact with refrigerant evaporator 270 is upgraded to a higher temperature and recycled to heat salt solution 205 before it enters the evaporative tower 220, thereby reducing or eliminating the system net heat input required from heat source 290 in the main heat exchanger 210 while also producing condensed water vapour 266 that may be put to a secondary beneficial use. Condensed water vapour 266 is captured in basin 267 and output from the plant through conduit 269.

Exemplar heat pump compressors include, but are not limited to, standard refrigeration system piston or screw compressors sized to match the heat pumps' evaporator and condenser operating pressures and flow rates. The refrigerant evaporator 270 is exposed to the moist air exhaust 229 which is less corrosive than other heat transfer surfaces in the system that are exposed to the salt solution 205, therefore, exemplar refrigerant evaporator 270 materials may be, coated copper, coated cupric-nickel, aluminum, or titanium. Exemplar coatings include heresite based corrosion inhibiting paints and epoxies. Exemplar refrigerants include, but are not limited to, R410A, R134a, or R245fa for heat pump cycles operating with a condensing temperature greater than 55 deg C. The heat pump condenser heat exchanger 211 is exposed to the corrosive salt solution 205 and therefore should be designed for corrosion resistance. Exemplar heat exchangers 210, 211 include, but are not limited to, tube-in-tube polyethylene heat exchangers or titanium plate and frame heat exchangers. The heat pump circuit 272 may be loaded and unloaded, or cycled on or off, based on the availability of heat from heat source 290, measured as the salt solution 205 temperature after valve 209.

The dehumidifying device 260 can include an optional demister 265 that entrains any water droplets carried over to prevent loss to the environment. In an alternative embodiment (not shown), the air flow may be orientated in vertical rather than horizontal configuration. Also the air flow in evaporative tower 220 may be oriented horizontally with vertical air flow in dehumidifying device 260, providing the benefit of additional demisting as condensed vapour droplets will tend to fall out of the air flow as it turns from a horizontal to a vertical path.

The optional clean-in-place system periodically circulates clean-in-place solution 285 through main pump 208, main heat exchanger 210 and heat pump condenser heat exchanger 211 to de-scale them, and sprays clean-in-place solution 285 to evaporative tower packing 224. The clean-in-place solution 285 may be heated with element 281 in tank 280 via heat supply 290. As previously discussed, the solution 285 may have acid, base, or anti-scalants added to reduce scaling, depending on the composition of the salt solution 205. Initiation of the clean-in-place system may be based on one of the criteria discussed above in relation to FIG. 1.

Pump and heat exchanger clean-in-place operation involves shutting down the evaporation circuit by closing valves 212 and 209, and opening valves 282 and 286, with valve 284 initially remaining closed. This action will circulate the warm clean-in-place solution 285 through the main pump 208 and heat exchangers 210, 211, thereby providing some degree of de-scaling as built-up salts re-dissolve into solution. The clean-in-place solution 285 is circulated back to tank 280 through valve 286 until a set period of time has passed to allow for cleaning. Tower packing can be cleaned immediately after, or any time as required, by maintaining valves 212 and 209 closed and 282 open, opening valve 284, and closing valve 286; thereby diverting clean-in-place solution 285 to the evaporative tower packing cleaning spray nozzles 288. The evaporative tower packing cleaning spray nozzles 288 may direct warm low salinity water at a high pressure and low flow rate at the packing surface 224 to remove attached scale. Preferably, a minimal amount of water will be added to the system. Make-up clean-in-place solution 283, which may be freshwater due to its increase solubility action, but could also be saltwater, can be added to the clean-in-place tank 280 based on an actuated valve or float valve. Valves 212, 282, 284, 286, and 209 may be automatically actuated through use of common air or electric valve actuation systems.

The embodiment described above with reference to FIG. 2 is an open humidification-dehumidification solution concentrating system. The open system described intakes outside air into the humidification zone and discharges air from the dehumidification zone to the environment. From an energy efficiency stand point, measured as units of mechanical power consumed by the heat pump compressor per unit of water processed, it is beneficial to operate the heat pump with the heat pump evaporator 270 temperature and refrigerant condensing heat exchanger 211 temperature as close as possible, while heating the saltwater to above the wet bulb temperature of the air but not above the ambient temperature when entering distribution header 222. Maintaining the saltwater temperature entering the evaporative tower at or below ambient will prevent sensible heat loss to the air. Cold climates may limit the capacity of open humidification-dehumidification systems. This is because cooler air holds less moisture. Therefore, a greater volume of colder than warmer air needs to be processed, making the footprint larger. Supplementary heat may be provided to pre-heat air input to open systems, yet this heat is rejected and lost.

Figure 3:
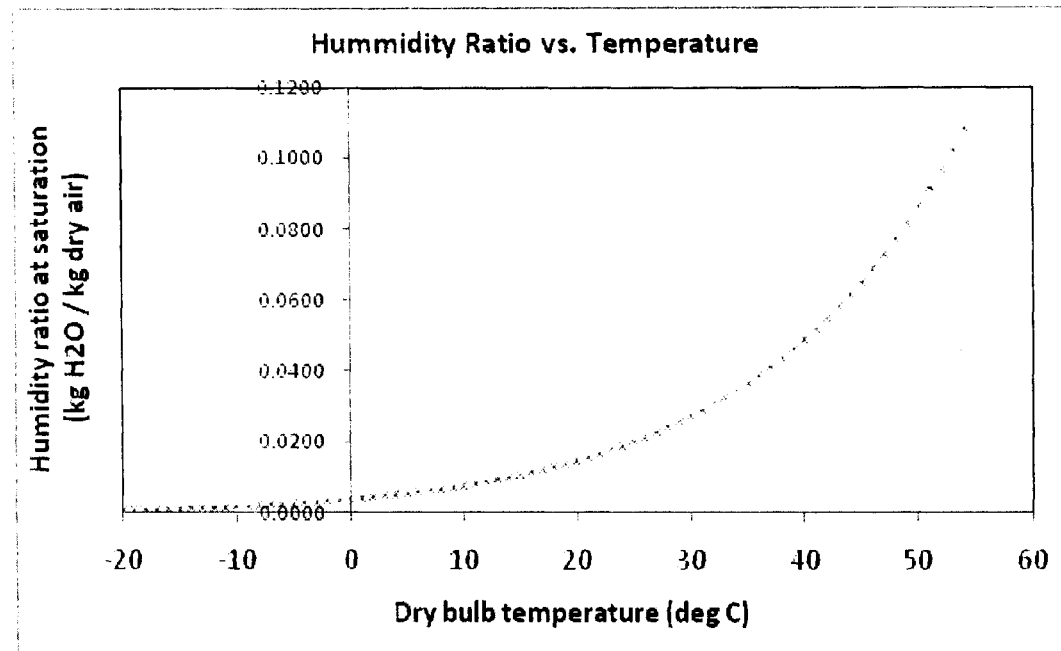
FIG. 3 is a graph showing air dry bulb temperature versus humidity ratio at saturation.

Psychrometrics govern air's thermodynamic properties and their changes with temperature and humidity. FIG. 3 is a plot of air dry bulb temperature versus humidity ratio. Humidity ratio is a measure of air's vapour capacity, at a certain temperature, in terms of kg vapour per kg dry air at saturation, or 100% relative humidity. FIG. 3 shows that humidity ratio increases with temperature. A greater rate of increase occurs at higher temperatures. This means that a 1 deg C. change in temperature at higher temperatures will result in a greater change in humidity ratio. For example, saturated air at 30 deg C. can hold seventeen times more water vapour per kg dry air than saturated air at −10 deg C. Meaning the warmer system has a higher capacity to process water mass for the same volumetric capacity. Air density allows conversion to volume, but also changes with temperature. For example, air at 30 deg C. is 1.4 times less dense than air at −10 deg C., meaning the warmer air will occupy 40% more volume than the cooler air. Dividing humidity ratio (kg H2O/kg dry) by density (kg dry air/m3) gives vapour capacity in terms of kg moisture held per m3 dry air (kg H2O/m3). Applying air density to the example, a system operating at 30 deg C. will have twelve times higher vapour capacity per unit volume (17 divided by 1.4) than a system operating at −10 deg C. It can therefore be beneficial for capacity, to operate a closed loop system at 30 deg C. as opposed to an open system with ambient air entering at −10 deg C.

A key difference between the open and closed system is that an open system can accept atmospheric air that is below saturation, for example at 75% relative humidity, whereas air in a closed system will always be near 100% relative humidity. Air that is below 100% relative humidity can hold additional moisture at the same dry bulb temperature until saturation is reached. This reduces heat input.

Exemplar thermodynamic properties for air at 75% and 100% relative humidity, and 30 and −10 deg C., are shown in Table 1 below. For example, 75% relative humidity air at 30 deg C. can accept an addition 0.007 kg H2O/kg dry air (0.0272-0.0202) as it moves towards 100% relative humidity. It could therefore be beneficial to operate an open system in warmer dryer climates were incoming air has additional vapour capacity. In contrast, the colder −10 deg C. air can only accept 0.0004 kg H20/kg dry air as it moves from 75% towards 100% relative humidity.

TABLE 1

Air dry bulb temperature versus humidity ratio at saturation

| Air Dry Bulb (deg C.) | Relative Humidity | Wet bulb (deg C.) | Humidity Ratio (kg H2O/ kg dry air) | Enthalpy (kJ/kg dry air) |
| --- | --- | --- | --- | --- |
| 30 | 75% | 26.30 | 0.0202 | 81.75 |
| 30 | 100% | 30.00 | 0.0272 | 99.69 |
| −10 | 75% | −10.75 | 0.0012 | −7.08 |
| −10 | 100% | −10.00 | 0.0016 | −6.09 |

For air below saturation, which is possible in an open system, heat added in the humidification zone is used largely for latent heating purposes (evaporating water) as opposed to sensible heating purposes (heating air). On the other hand closed systems operate with the air always at saturation. Therefore, the only way to add water vapour to saturated air is by heating the air to increase its vapour capacity. Air heating to increase vapour capacity can be achieved by direct contact with the warmer humidifying solution or by heat exchange with an external heat source. In general, heating saturated air to evaporate water will require more heat input than evaporating water to air that is below saturation. It is therefore more energy efficient to humidify air below saturation than to heat and humidify air already at saturation, making the heat load higher for closed systems.

Figure 4:
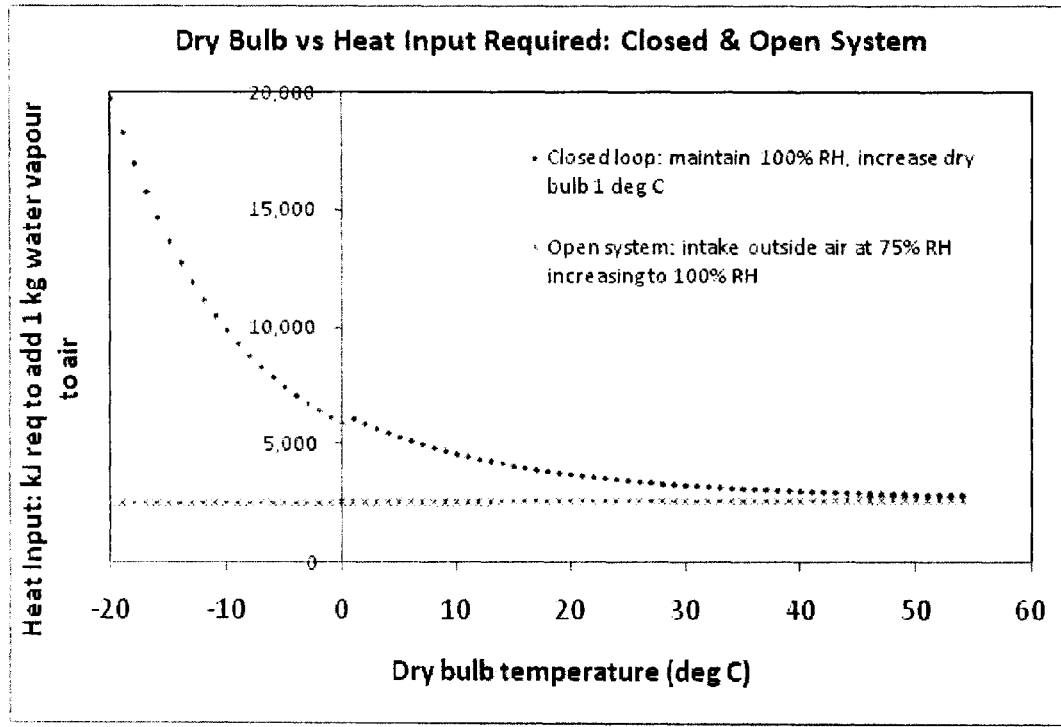
FIG. 4 is a graph showing air dry bulb temperature versus change in heat input required to evaporate 1 kg of water for open and closed systems.
Figure 5:
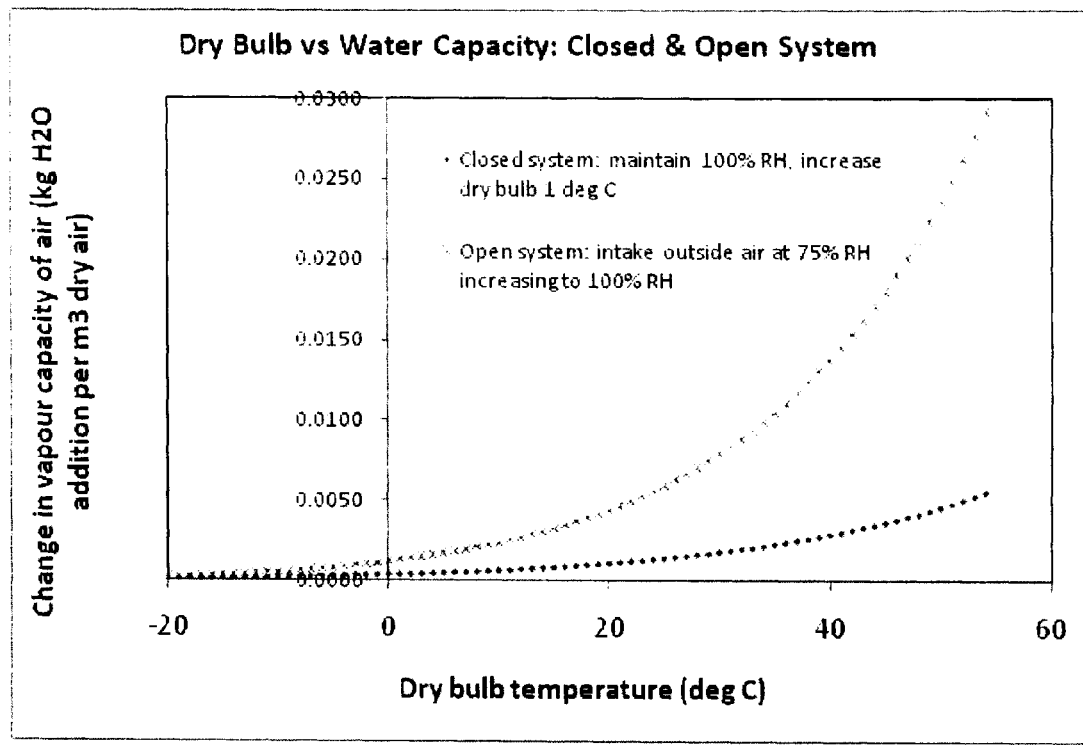
FIG. 5 is a graph showing air dry bulb temperature versus change in vapour capacity of air for open and closed systems.
Figure 6:
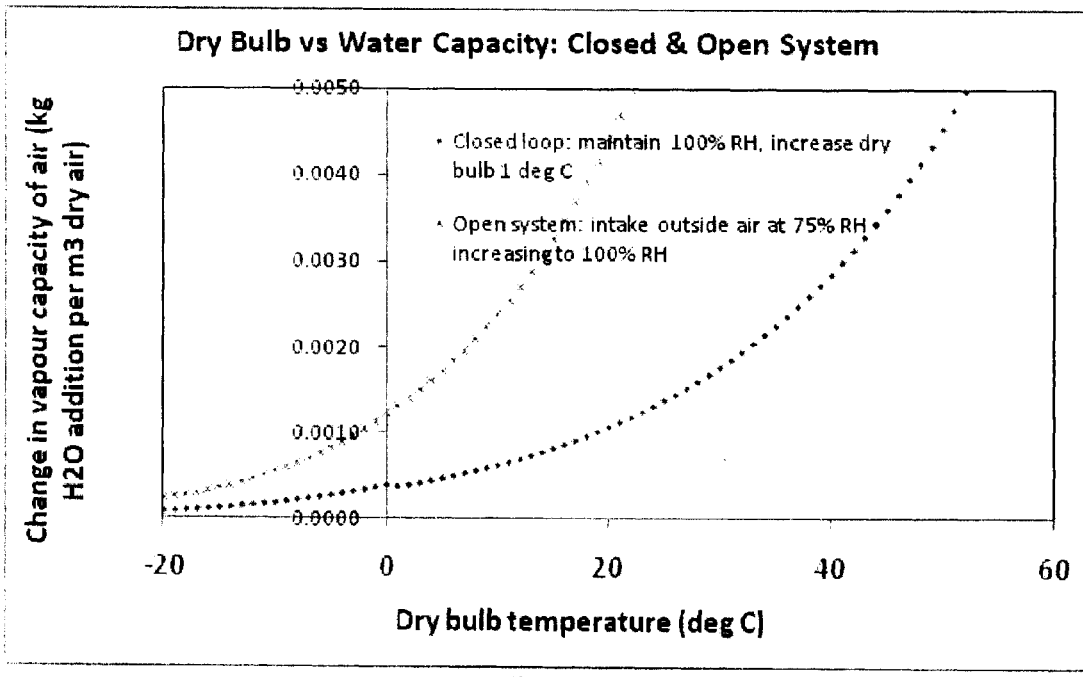
FIG. 6 shows the graph of FIG. 5 zoomed in on a smaller Y-axis range for higher resolution.

FIGS. 4, 5 and 6 compare the thermal and capacity performance of closed and open systems.

FIG. 4 compares the heat input required for a one degree Celsius change in temperature for open and closed systems over a range of air dry bulb temperatures on the x-axis. Heat input is expressed as kJ per kg of water vapour added to the air. FIG. 4 shows two scenarios as follows:

1. Closed loop: heating saturated air (100% relative humidity) by 1 deg C., increasing vapour capacity, and evaporating water until saturation is reached again.
2. Open system: taking in 75% relative humidity air and humidifying it to 100% relative humidity.

FIG. 4 shows that closed systems have higher heat input requirements than open systems, yet the difference diminishes at higher temperatures. For example, at temperatures higher than 30 deg C. the heat input requirements for open and closed systems converge as they approach the latent heat requirement to evaporate water. As a result, the additional heat input requirement for closed systems becomes marginal at temperatures that are for example higher than 30 deg C. In turn making closed systems' thermodynamic performance comparable to open systems at the same temperature. Therefore, operating a closed system at an elevated temperature in a cold climate can achieve the capacity benefits with marginal heat load increase.

FIGS. 5 and 6 compare open and closed systems' change in vapour capacity with temperature. FIGS. 5 and 6 show the change in vapour capacity (kg H2O per m3 dry) for the same two scenarios as given in FIG. 4. FIGS. 5 and 6 are identical with the exception that FIG. 6 zooms in on a smaller Y-axis range for higher resolution.

FIGS. 5 and 6 show that in an open system, humidifying air from 75% to 100% relative humidity will result in greater vapour capacity increase than heating saturated air by 1 deg C. This means at the same temperature, a closed system will have a lower capacity than an open system. However, closed systems can be operated at an elevated temperature without the need to continuously pre-heat the air since warm exhaust air is re-circulated rather than discharged. FIGS. 5 and 6 also show that a closed system operating at an elevated temperature can have a higher capacity than an open system at a cooler temperature. For example, a closed system at 30 deg C. heating saturated air by 1 deg C. has a change in vapour capacity of 0.0303 kg H2O per m3 dry air, which is three and a half times higher than the change in vapour capacity of an open system at −10 deg C. Therefore, in an exemplar −10 deg C. cold climate, greater capacity will result from a closed system at 30 deg C. vs. an open system at −10 deg C., with little deficit in increased heat load according to FIG. 4. The capacity increase benefits of closed systems become even more prevalent at operational temperatures of 40 or 50 deg C.

If designed to operate at an elevated temperature, the closed system capacity can be maintained regardless of external environment temperatures. This removes capacity fluctuations with changes in weather, something that open systems suffer from unless air preheat is employed. For example, an order of magnitude capacity decrease results when an open system operating at 22 deg C. is operated at −10 deg C. This can result in upstream and downstream process management challenges. Beneficially, a closed system will not experience these capacity swings with external environment temperature if the internal temperature can be maintained through sound insulation practices and replacement of sensible heat losses to the external environment.

Most climates see temperature swings, between day and night as well as seasons. Closed systems may be preferred for their high capacity when it is cold outside. During warmer times open systems offer both lower energy and higher capacity as shown in FIGS. 5 and 6. It is therefore advantageous to develop a hybrid open-closed system that can operate from fully closed during colder times to fully open in warmer weather. The proportion of open vs. closed depends on the closed system design and capacity needs of the operator. In reference to FIGS. 5 and 6, drawing a horizontal line from a selected closed system elevated operating temperature to intersect the open system curve reveals the temperature on the x-axis under which closed systems will have higher capacity than open systems. For example, at a 30 deg C. elevated operating closed system temperature will have higher capacity than open systems if the external environment is less than 4 deg C. Above 4 deg C. and below 75% relative humidity, open systems can offer high capacity in addition to having lower energy needs. Therefore, having the ability to take in outside air and control the degree of open vs. closed will enable greater capacity control flexibility with outside temperature.

In an alternative embodiment an adjustable semi to full closed loop humidification-dehumidification solution concentrating system enables greater capacity control independent of external environmental conditions. In the closed loop system saturated air circulates through the humidification and dehumidification zones through an adjoining conduit or duct, which may be insulated. Circulation of the saturated air stream prevents heat loss to atmosphere and enables operation at an elevated temperature. In cold climates, closed loop systems operating at an elevated internal temperature will have higher capacity than an open system operating at the colder external temperature. Insulating the process will further reduce heat losses, which if small can be replaced by supplementary compressor or available heat power.

Figure 7:
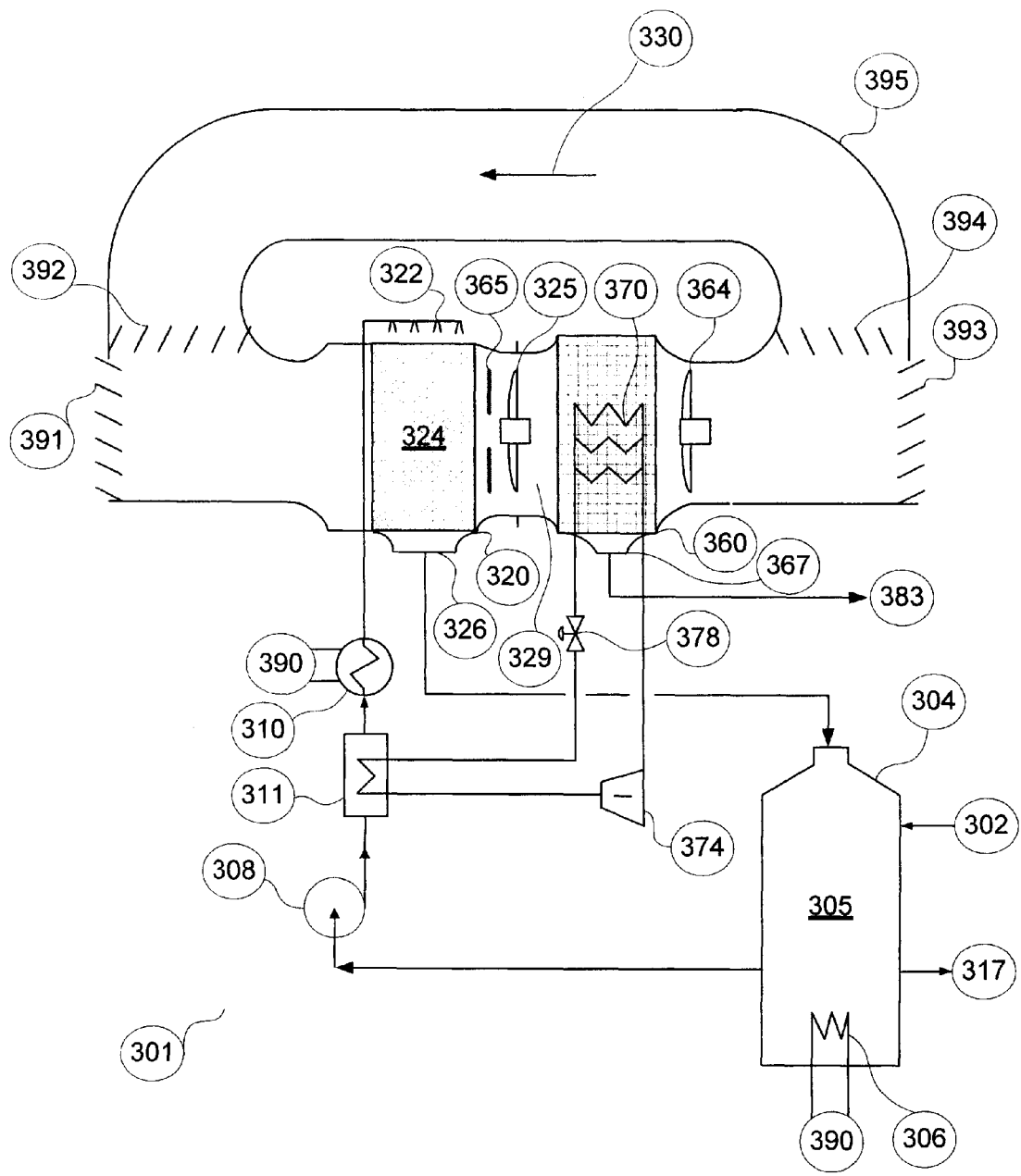
FIG. 7 is a schematic view of an adjustable closed loop solution concentrating system according to an embodiment.

Referring to FIG. 7 there is shown an adjustable closed loop solution concentrating system 301, which consists of three sub-systems:
- Solution concentrating circuit: removes water from the system via humidification zone 320 subsequently concentrating solution, such as saltwater 305, in tank 304;
- Carrier gas circuit: circulates a gas 330 through insulated duct 395 in a closed loop for subsequent humidification in humidification zone 320 and dehumidification in dehumidification zone 360. The gas 330 is herein referenced to air but could include nitrogen, helium, methane or other gases that can be consecutively humidified and dehumidified; noted that certain carrier gases such as helium will provide capacity per unit volume benefits due to their increases ability to hold moisture per unit gas volume;
- Heat pump circuit: captures heat from warm moist air 329 exiting from humidification zone 320 and upgrades it to heat the salt solution 305 in heat pump condenser 311;

The saltwater concentrating circuit accepts make-up saltwater 302 from an upstream process into bulk tank 304. Bulk tank 304 may include an optional heater element 306, supplied with heat source 390, which warms the bulk salt solution 305 prior to pumping in order to reduce the likelihood of precipitation in the downstream pipework. Heat source 390 may include heat discharged from other processes, electric resistive heating, or any other available heat source. Salt solution 305 exits bulk tank 304 via an outlet. The outlet may be positioned at least 15 cm above the tank base to prevent egress of solids that may have accumulated in the base of the tank 304. Main pump 308 pumps the salt solution 305 through the heat pump condenser 311 where heat is transferred from condensing heat pump refrigerant thereby heating salt solution 305. An optional downstream supplementary heat exchanger 310 may be employed with external heat source 390. The supplementary heat exchanger 310 powered with external heat source 390 reduces heat pump compressor 374 load and capacity. One or more supplementary heat exchanger 310 may be added to the system depending on the availability and cost of heat source 390 in comparison to the cost of compressor capacity and said compressor prime mover load.

The objective of heat exchanger 310 and heat pump condenser 311 is to warm the salt solution temperature to approximately 5 deg C. or greater above the wet bulb temperature of the air 330 entering the humidification zone 320. The now warmed salt solution 305 enters the salt solution distribution header 322, and passes through media 324 in humidification zone 320 that promotes heat and mass transfer from water to air. Exemplar media 324 includes, but is not limited to, typical cooling tower splash fill or film fill packing known to those skilled in the art. The salt solution in humidification zone 320, which is warmer than the wet bulb temperature of the air 330 entering humidification zone 320, transfers latent heat and evaporates water to air as they both pass through humidification zone 320. As evaporation occurs, salt solution 305 is cooled and concentrated. The cooled and concentrated salt solution is captured in saltwater collection basin 326 and returned to bulk tank 304. Concentrated salt water exits the system via manifold 317. An optional precipitant and sediment collection vessel (not shown) may be inserted between saltwater collection basin 326 and bulk tank 304. Solids may be extracted from the optional precipitant and sediment collection vessel. The saltwater concentrating circuit process can be completed on a continual basis or batch basis. In continuous mode, make-up saltwater 302 is added, concentrated, and extracted continuously. In batch mode, tank 304 is filled, concentrated, and then discharged.

Referring now to the air circuit, there is provided an insulated duct 395 with an open system inlet vent 391, a closed system inlet vent 392, an open system outlet vent 393 and a closed system return vent 394 which allow for hybrid operation between a fully open and fully closed system. Positions of the vents 391, 392, 393, 394 to provide for fully open and fully closed systems are given in Table 2.

TABLE 2

Positioning of vents for fully open and fully closed systems

| Vent | Description | Fully Open System | Fully Closed System |
|---|---|---|---|
| 391 | Open System Inlet Vent | Open | Closed |
| 392 | Closed System Inlet Vent | Closed | Open |
| 393 | Open System Outlet Vent | Open | Closed |
| 394 | Closed System Return Vent | Closed | Open |

The decision whether to operate as an open system, closed system, or partially closed system may depend on the outside air temperature, outside air relative humidity, and the design temperature for the fully closed system. At a set closed system elevated design temperature, there exists a break even capacity where closed and open systems capacity are matched for a lower outside air temperature and relative humidity, as described above with reference to FIGS. 5 and 6. Generally, if the outside air is below the break even air temperature and humidity, a closed system will provide higher capacity. If however the outside air is above the break even air temperature and humidity, an open system will offer increased capacity and lower input energy requirements. Capacity and energy input can be adjusted beneficially above the break even air temperature and humidity by throttling open the open system inlet and outlet vents 391, 393 and throttling closed the closed system inlet and return vents 392, 394. This will allow outside air to enter, which if above the break even air temperature and humidity, will enable increased capacity. If the outside air is warmer than the closed system design elevated temperature, highest capacity will be achieved in fully open system mode. Adjustment of vents 341, 342, 343, and 344 allows for optimization of capacity and energy for external conditions between the break even air temperature and humidity and closed system design elevated temperature.

Warm moist air 329 exiting humidification zone 320 passes through an optional demister 365 to remove any entrained saltwater droplets. A single or multiple fans can be used and placed at a variety of locations in the air circuit. In FIG. 7, a first fan 325 is placed after the humidification zone 320 and a second fan 364 after dehumidification zone 360. Those skilled in the art of humidification media design can specify the air flow rate and surface area required to achieve the desired evaporation rate based on air and saltwater temperatures as well as inform on the expected air pressure drop through the humidification zone 320. Those skilled in the art of air systems design can size and specific the fan location such that the required air flow rate can be processed based on the combined pressure loss of the humidification zone 320, demister 365, dehumidification zone 360, air duct 395 and any other components. The entire air circuit may be insulated for use in cold climates in order to prevent sensible heat loss to the surroundings. Changing the internal air pressure of the system may also change capacity. For example when operating at less than atmospheric pressure, the vapour fraction of water in the gas will increase thereby increasing capacity. In a fully closes system gases other than air can also be used, for example methane, helium, hydrogen, or nitrogen with differing heat capacities that will provided different thermal and capacity performance. When processing highly impaired waters, such as those contaminated with hydrocarbons, the open system vents 391 and 393 also provide a means to release non-condensable gases and intake fresh air. The non-condensable gases may be passed through an air scrubber, such as activated carbon filters, to remove any hazardous or detrimental chemicals.

Referring now to the heat pump circuit, heat pump evaporator 370 extracts heat from the dehumidification zone 360 by evaporating a refrigerant inside the heat pump evaporator 370. Those skilled in the art of dehumidification heat pump evaporator design can specify the evaporator surface area, heat transfer and pressure drop at the air flow rate. Moisture will condense external to the heat pump evaporator 370 on the cold evaporator surface. Condensed moisture, which may be fresh water 383, is collected in basin 367 and sent out of the process for another use. A heat pump compressor 374 compresses vaporized refrigerant exiting heat pump evaporator 370 to a sufficient pressure that enables refrigerant condensation in the heat pump condenser 311 at a temperature greater than the desired saltwater exit temperature from heat pump condenser 311. Liquid refrigerant at the elevated pressure exits the condenser 311 and passes through a refrigerant expansion valve 378, which lowers the pressure to enable low temperature evaporation in the heat pump evaporator 370 and cooling of its external surface. Adjustment of the refrigerant expansion valve 378 will adjust the heat pump evaporator 370 thermal load and operating temperature. In this embodiment an expansion valve is shown, however, in alternative embodiments any refrigerant expansion device, for example a capillary tube, may be used to lower the pressure of refrigerant before it enters the evaporator 370. Optionally, a heat pump evaporator defrosting system (not shown) may be included to defrost the evaporator surface. Exemplar defrosting systems include hot gas defrost, hot water defrost, and electric defrost among others. Known to those skilled in the art; an exemplar heat pump compressor 374 may include, but is not limited to, a screw or scroll compressor. An exemplar heat pump condenser 311 may include, but is not limited to, a titanium plate and frame condenser. An exemplar heat pump evaporator 370 may include, but is not limited to, copper tube aluminum finned evaporator coils. An exemplar refrigerant expansion valve 378, may include, but is not limited to, thermostatic expansion valves controlled based on the temperature of refrigerant exiting the evaporator.

If an external hot and cold source is available, the heat pump circuit may be removed. The hot source can beneficially provide heat via heat exchanger 390 and the cold source providing cooling fluid to a finned tube heat exchanger, or equivalent, in the same location as heat pump evaporator 370. Removing the heat pump will reduce the electrical power requirements, yet a sufficient heat and cold source should be available.

The system described may be suited for modular dispatch and operation. Modules (not shown) can be built for ready transport and dispatch, with the module shell providing protection from the environment, structural support and restraint, and enabling simplified transport and site implementation. Exemplar modular dispatch could include constructing the humidification and dehumidification zone into a standard ISO insulated refrigerated shipping container, with the refrigeration unit removed. Successive humidification and dehumidification zones with vents could be built into a single 40 foot standard container. The humidification and dehumidification zone container could be mounted on top of another similar module containing the saltwater pumps, tanks, electrical and controls infrastructure, and optional heat pump machinery, supplementary heat exchanger, salt settling vessel, solids extraction system and the like.

Saltwater concentrating systems concentrate a bulk salt solution by removing water. As water is removed, the salt solution reaches saturation and solids can be formed in a collection cone tank. In an alternative embodiment, solids, or a slurry of water and solids, are extracted using a motorized cooled auger. An auger cooling circuit lowers the temperature of the mixture being extracted which increases its density to improve dewatering, and reduces the solubility of dissolved salt to increase particle size; the combination of both improve salt extraction. The auger is angled to convey solid, such as salt at an incline with the auger exit opening at a higher level than the level of the solution in the collection cone tank. Materials of construction such as polyethylene, polypropylene, or PTFE may be beneficially used for their smooth surfaces and reduced likelihood of salt adhesion. An optional precipitation promoter unit or similar device may encourage salt precipitation in desired locations.

Figure 8:
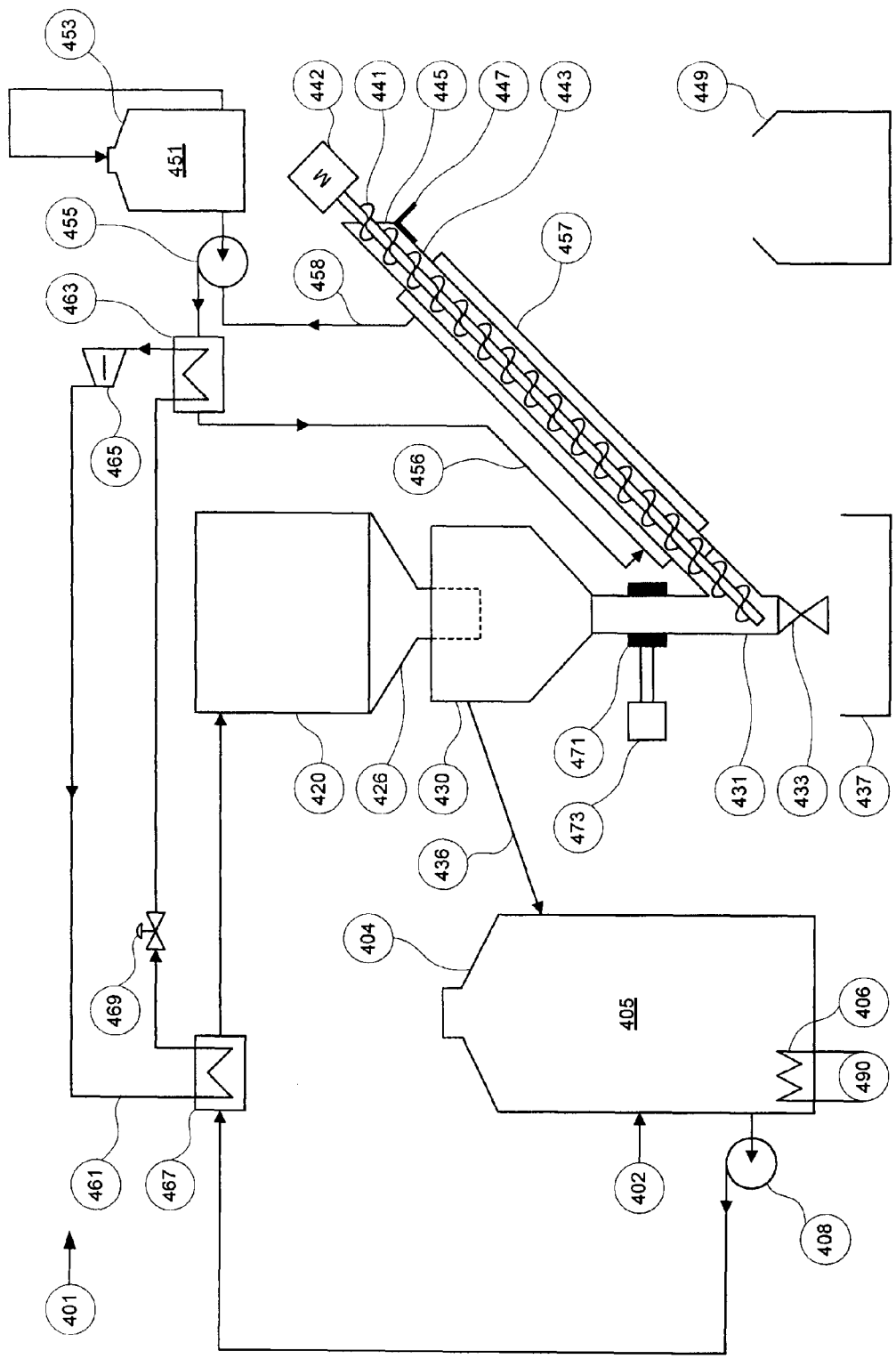
FIG. 8 is a schematic view of a solution concentrating system with solid extractor apparatus according to an embodiment.

Referring to FIG. 8, there is shown a saltwater concentrating system 401 with salt extractor apparatus, which consists of three sub-systems:
  Saltwater concentrating circuit: removes water from the system via evaporative tower 420 and produces solid or near solid salt in collection cone tank 430;
  Auger assembly: removes solids using auger 441;
  Optional refrigeration circuit: withdraws heat from auger cooling circuit using coolant heat exchanger 463 and upgrades the heat using heat pump compressor 465 to preheat bulk solution 405 in condensing heat exchanger 467, or rejects the heat to atmosphere.

In the exemplar saltwater concentrating circuit, bulk tank 404 receives saltwater from saltwater source 402 that requires concentrating and volume reduction. Saltwater from saltwater source 402 may include, but is not limited to, desalination plant brine or waste water from an industrial process. Bulk tank 404 may include an optional heater element 406, supplied with heat source 490, which warms the salt solution 405 prior to pumping, in order to reduce the likelihood of precipitation in the downstream pipework. Heat source 490 could include heat discharged from other processes, electric resistive heating, or any other available heat source. Salt solution 405 exits bulk tank 404 via an outlet. The outlet may be positioned at least 15 cm above the tank base to prevent egress of solids that may have accumulated in the base of the tank 404. Bulk tank pump 408 pumps the salt solution 405 to evaporative tower 420 that concentrates salt solution 405. The concentrated salt solution is captured in saltwater collection basin 426 and passes into collection cone tank 430. If the concentrated salt solution reaches saturation due to the removal of water, solid salt will precipitate. Heavier salt particles fall to the base of collection cone tank 430 while the lower density and less saturated solution rises and exits through conduit 436 to return to bulk tank 404. The system is designed for temperature stratification and hydraulics such that salt precipitates in the cooler, less turbulent, base of collection cone tank 430 while salt precipitation is prevented in the warmer bulk tank 404. This is achieved by distributing the flow entering the cone tank 430 away from and preventing downward thrust into the sedimentation zone. Thrust plates or distributors (not shown) that prevent disturbance of salt at the base of the collection cone tank 430 can be employed. The saltwater concentrating circuit may operate on a continuous or batch basis. Under continuous operation, make-up salt water 402 is added, concentrated, and extracted continuously. In batch mode, tank 404 is filled, concentrated, and then discharged.

Referring now to the auger assembly, precipitated salt from the base of collection cone tank 430 passes into auger collection conduit 431 by gravity. If needed for matters of maintenance, collection cone tank 430 and auger collection conduit 431 can be purged into collection bin 437 by opening auger collection conduit purge valve 433. Purging of collection cone tank 430 and auger collection conduit 431 may be required in the event of routine cleaning or to clear a blockage resulting from excessive scaling. Auger 441 is placed at an incline such that the blades at the lowest point of said auger 441 are within the cavity of auger collection conduit 431 and in contact with the precipitated salts in said auger collection conduit 431. Auger 441 is driven by auger motor 442 and rotates within auger housing 443 and auger collection conduit 431. Auger 441 conveys precipitated salts out of auger collection conduit 431 and upwards through auger housing 443 to exit auger housing 443 at auger housing opening 445, then down auger housing lip 447 and into salt disposal tank 449. Auger housing opening 445 is located vertically higher than the level of the solution in collection cone tank 430 to prevent liquid in collection cone tank 430 from exiting through auger housing 443. The speed, torque, and frequency of operation of the auger motor 442 and the angle of auger 441 may be selected depending on the particle size, viscosity, rate of precipitation, and critical angle of repose of the mixture being conveyed. Experiments have shown that the auger salt extraction rate increases considerably when solids in the cone tank 430 are not disturbed. It can therefore be beneficial to periodically stop inflow into the cone tank 430 from evaporative tower 420. This will allow solids to settle undisturbed and assist extraction. It can also be beneficial to include a diffuser (not shown) within cone tank 430 to direct flow away from the bottom settlement zone.

Materials of construction for the auger assembly such as polyethylene, polypropylene, or other low friction materials may be beneficially used for their smooth surfaces and reduced likelihood of salt adhesion in auger assembly components and pipework. The auger assembly operates at near ambient temperature which beneficially enables the use of lower cost plastics as materials of construction instead of corrosion resistant steels. The mechanical extraction of the auger assembly negates the need for a slurry pump or downstream solids-liquids separating unit.

The auger assembly may also include an auger cooling circuit. Auger coolant tank 453 contains auger coolant 451. Exemplar coolants include, but are not limited to, fresh water, saltwater, ethylene glycol, propylene glycol, or other fluids with suitable thermal capacity, viscosity, and material compatibility with auger cooling circuit components and pipework. Auger coolant pump 455 pumps inlet auger coolant 456 through auger coolant jacket 457 which surrounds auger housing 443 using a spiral, parallel, or other arrangement. For example, auger coolant may flow inside the shaft of auger 441. Inlet auger coolant 456 beneficially lowers the temperature of the mixture being extracted thus increasing its density and reducing solubility. The increased density beneficially reduces the height of the salt solution slurry in the auger housing 443, providing an increased "dry zone" within the auger housing 443, which assists in solids de-watering. The reduced solubility increases precipitation and particle size formation within the auger housing 443 and auger collection conduit 431. As a result, the cooled auger assembly enables more reliable salt extraction. Inlet auger coolant 456 is warmed as it passes through auger coolant jacket 457. Warm outlet auger coolant 458 is returned to auger coolant tank 453.

Referring now to the refrigeration circuit 461, heat from auger coolant 451 is extracted by heat exchanger 463 lowering the temperature of said inlet auger coolant 456. Refrigeration circuit 461 contains a refrigerant which is expanded by expansion device 469 to evaporate at a temperature lower than the temperature of the inlet auger coolant 456 plus an additional margin to allow for heat transfer resistance. Refrigeration compressor 465 compresses the refrigerant gas to a sufficient pressure that will enable condensation of the refrigerant in condensing heat exchanger 467 at a temperature greater than the salt solution 405 entering the condensing heat exchanger 467. This results in condensation of the refrigerant inside the condenser heat exchanger 467, transferring the refrigerant's latent heat of condensation to heat the salt solution 405. This beneficially results in heat from outlet auger coolant 458 being upgraded to a higher temperature and recycled to heat salt solution 405 before the salt solution enters evaporative tower 420. The pressure of refrigerant gas is reduced by passing the gas through expansion device 469 before it enters heat exchanger 463. Alternatively, heat extracted from auger coolant 451 may be directed to a heat exchanger (not shown) built into bulk tank 404 or to atmosphere (not shown). Alternatively and not shown, a thermoelectric chiller may be used in place of the refrigeration system heat exchanger 463, thereby removing the need for refrigeration compressor 465 and expansion device 469 described above. Thermo-electric chillers are known to those skilled in the art and built from dis-similar metals to provide a cooling effect through passage of electric current. Heat from the thermo-electric chiller may be optionally discharged to the environment or to the saltwater through a heat exchange at a similar location to condensing heat exchanger 467.

The auger assembly may optionally include an electrically driven precipitation promoter unit 471 that induces dissolved salt to precipitate into larger crystals thereby increasing the efficiency of salt extraction. Precipitation promoter unit 471 is connected to a power supply 473 and attached to auger collection conduit 431 or other locations where increased precipitation is desirable. Exemplar precipitation promoter units 471 may include, but are not limited to, solenoid-induced molecular agitation devices employing a solenoid coil carrying an oscillating electric field and wrapped around the pipe in which increasing precipitation is desired.

The embodiment described above with reference to FIG. 8 describes the auger assembly in use with a exemplar salt concentrating circuit. In alternative embodiments (not shown) the auger assembly may be used for collecting and harvesting solids participated from solution with any solution concentrating systems, such as the solution concentration systems shown in FIGS. 1 and 11-13.

Components that make-up a humidification driven saltwater concentrating system can develop scale with time, which will hamper performance. Hot freshwater is an effective cleaning agent for many scaling compounds. However, hot freshwater may be scarce in some regions. Additionally, adding freshwater to the system is counterproductive given the purpose of the saltwater concentrating system which is to concentrate a salt solution, therefore the amount of freshwater being added should be minimized.

In an alternative embodiment, the saltwater concentrating system includes an automated clean-in-place system to reliably clean components of the system. Process conditions are measured and interpreted to determine when a cleaning is required. A wash solution, which could be freshwater, is heated and used to wash humidification zone media, commonly known as fill or packing, by spraying the scaled media with warm wash solution at a low flow and moderate pressure. Wash solution is also used to clean the saltwater pump, heat exchanger and other "in-pipe" components collectively defined as pipework. Sensors and logic are included to determine when cleaning is required. A control system and actuated valves are included to minimize human intervention during cleaning such that the system can run unattended and reliably; beneficially de-scaling itself when required.

Figure 9:
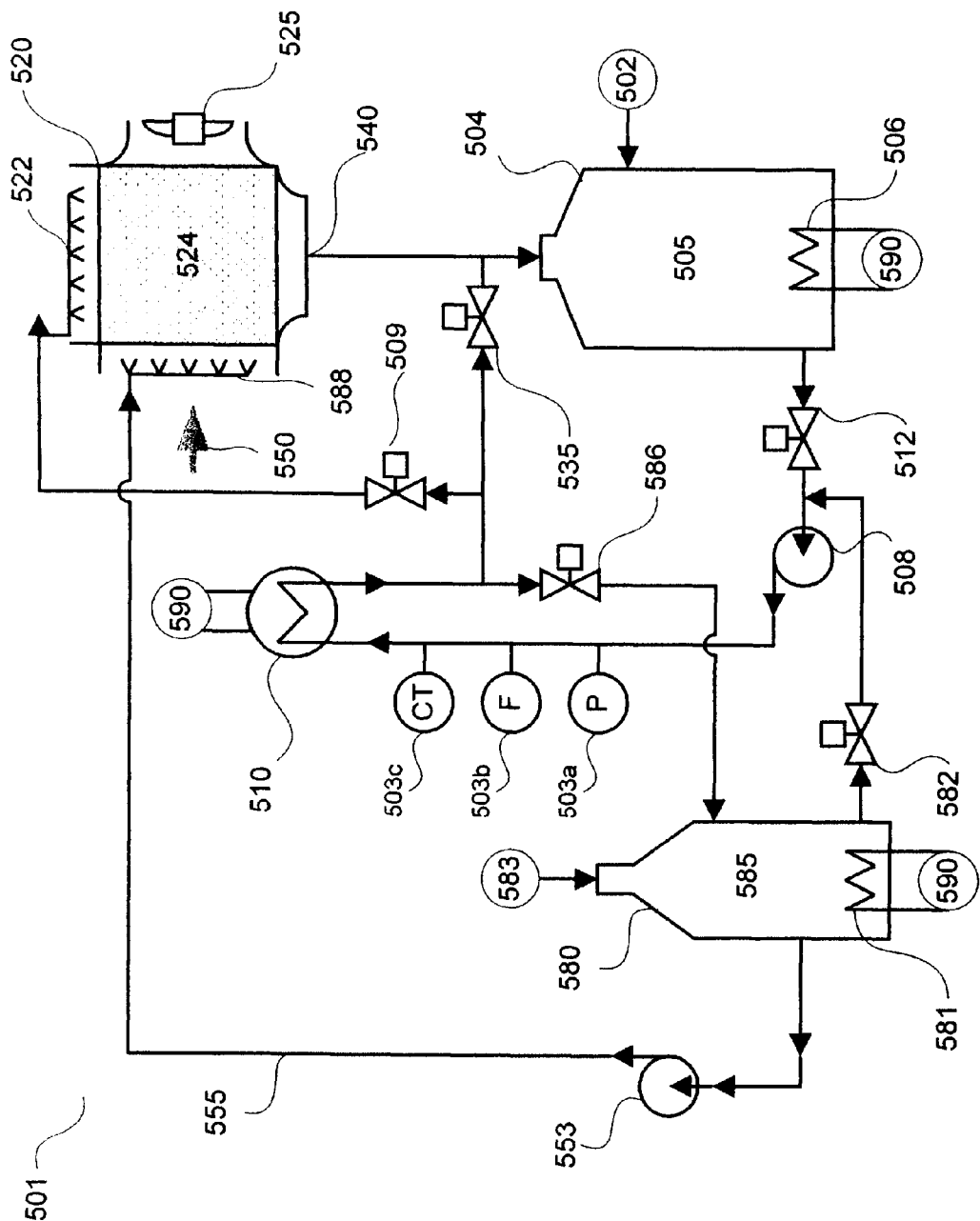
FIG. 9 is a schematic view of a solution concentrating system with automated clean-in-place system according to an embodiment.
Figure 11:
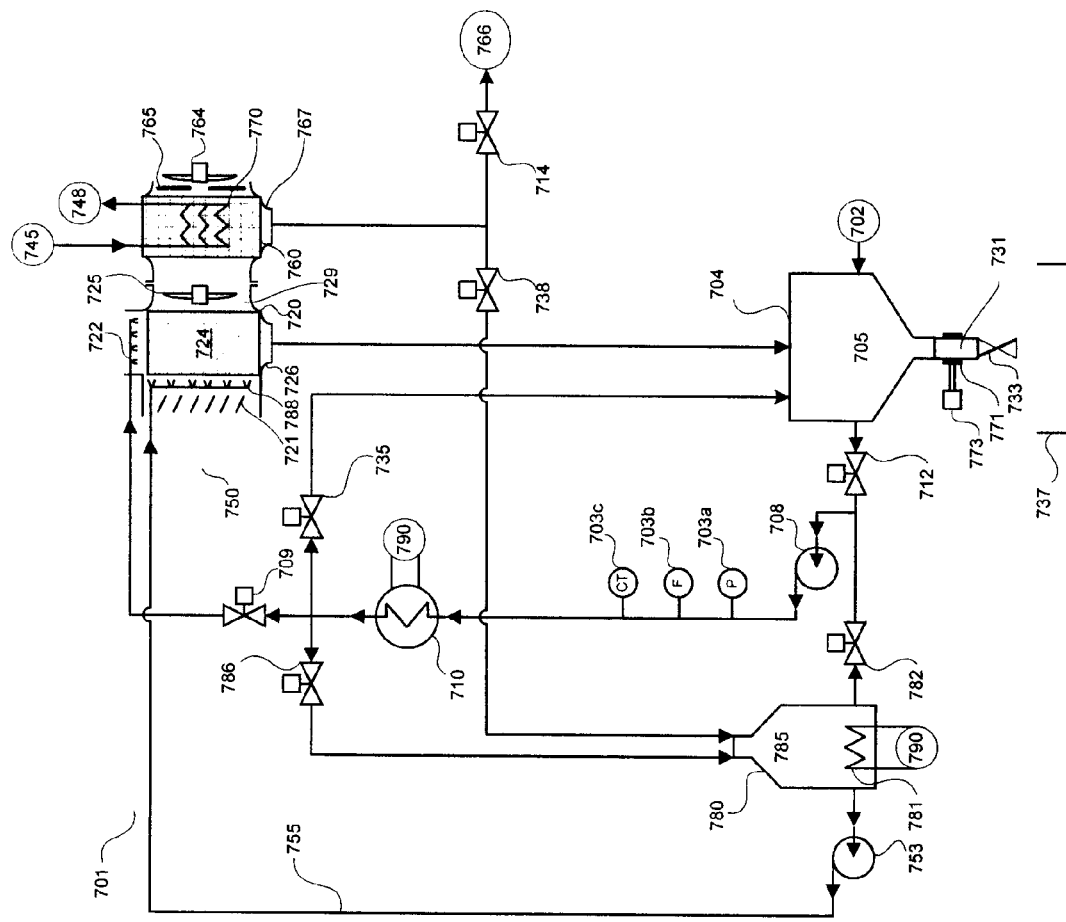
FIG. 11 is a schematic view of a condensed water production solution concentrating system according to an alternative embodiment.
Figure 12:
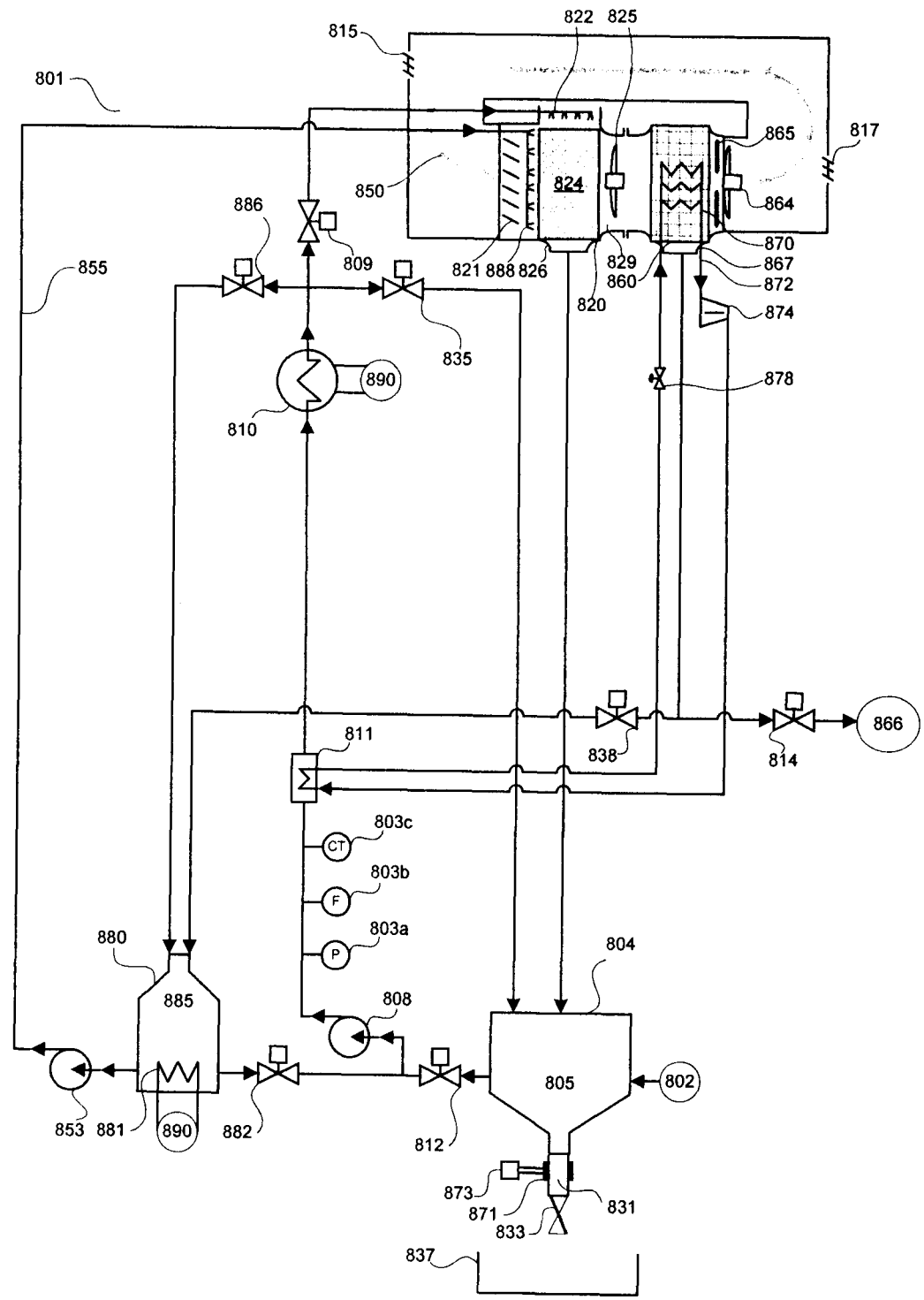
FIG. 12 is a schematic view of a heat recovery and condensed water production solution concentrating system according to an alternative embodiment.

Referring to FIGS. 9, 11 and 12 there is shown a humidification driven saltwater concentrating system 501, 701, 801 with automated clean-in-place system, which consists of two key operating modes:
1. Salt water concentrating mode
2. Cleaning mode Actuated valves are included to swap between operations of (1) salt water concentrating mode, and (2) cleaning mode. The saltwater concentrating mode is described first. Bulk tank 504, 704, 804 contains salt solution 505, 705, 805 received from saltwater source 502, 702, 802 that requires concentrating and volume reduction. Salt solutions may include but are not limited to desalination plant brine or waste water from an industrial process. Bulk tank 504 may have an optional bulk tank heater 506 drawing heat from heat source 590. Bulk tank heater 506 heats the salt solution 505 to reduce the risk of precipitation in bulk tank pump 508. Exemplar heat sources 590 include: electric heat, reject heat from another process, or other suitable heat sources. Salt solution 505, 705, 805 from bulk tank 504, 704, 804 exits through a normally open bulk tank outlet actuated valve 512, 712, 812 and is pumped by bulk tank pump 508, 708, 808 to heat exchanger 510, 710, 810 while passing through pressure sensor 503a, 703a, 803a; flow sensor 503b, 703b, 803b; and conductivity sensor 503c, 703c, 803c; collectively "sensors" 503, 703, 803. One of each pressure sensor 503a, 703a, 803a; flow sensor 503b, 703b, 803b; and conductivity sensor 503c, 703c, 803c; are shown; however, they may be optionally removed or additional sensors may be employed as specified by the designer. For example, temperature sensors (not shown) could be added on the inlet and outlet of heat exchanger 510, 710, 810.

Heat exchanger 510, 710, 810 is provided with heat source 590, 790, 890 that heats the saltwater to above the wet bulb temperature of the air 550, 750, 850 passing through the humidification device 520, 720, 820. In the embodiment shown in FIG. 12, there is also a heat pump condenser 811 in the solution flow path, which works in conjunction with heat exchanger 810 to heat the salt solution 805 before it enters the humidification device 820. The now warmed salt solution 505, 705, 805 passes through normally open humidification device actuated valve 509, 709, 809 bypassing normally closed cleaning tank return actuated valve 586, 786, 886 and bulk tank return actuated valve 535, 735, 835. The salt solution enters the salt solution distribution header 522, 722, 822 and passes through humidification zone media 524, 724, 824 in direct contact with air 550, 750, 850. Air 550, 750, 850 passes through humidification zone media 524, 724, 824 under action of fan 525, 725, 825. Humidification zone media 524, 724, 824 promotes heat and mass transfer between the saltwater and air, effecting evaporation of water to air. Exemplar humidification zone media 524, 724, 824 may include, but are not limited to, cooling tower splash fill or film fill packing known to those skilled in the art. The humidification zone media 524, 724, 824 may be constructed from corrosion and scale resistant materials such as polyvinyl chloride, polypropylene or polyethylene. In the embodiment shown in FIG. 9, the cooled and concentrated salt solution exits the humidification device 520 and is returned to bulk tank 504 via conduit 540. In the embodiments shown in FIGS. 11 and 12 the cooled an concentrated salt solution exits the humidification device 720, 820 and is returned to cone shaped bulk tank 704, 804 where salts may be precipitated and collected as described below.

During normal operation, scale may develop on various salt water concentrating system components. In the cleaning mode operation, two cleaning modes may be utilized as follows:
1. Humidification zone cleaning mode
2. Pipework cleaning mode These cleaning modes can be initiated based on pre-determined times or by sensing performance degradation and initiating cleaning only when required. Scaling of system components will degrade performance. Cleaning will restore performance if the sealants can be removed by the cleaning solution.

The extent of scaling, and resulting need for cleaning, can be sensed as outlined herein. Scaling of humidification zone media 524, 724, 824 can be sensed by either increased fan 525, 725, 825 load measured by a current transducer on the fan motor power feed (not shown) or through increased differential air pressure measurement across the inlet and outlet of the humidification zone media 524, 724, 824 measured by an air differential pressure sensor (not shown). An increase of either fan motor current or air differential pressure will indicate humidification zone media 524, 724, 824 scaling/clogging at which time the humidification zone cleaning mode can be initiated.

Scaling of the bulk tank pump 508, 708, 808 and heat exchanger 510, 710, 810 can be sensed by decreased flow at a set pressure for a fixed speed pump, or increased pump current draw for at a set flow rate or pressure. Scaling of heat exchanger 510, 710, 810 and heat pump condenser 811 could also be sensed through degradation of heat transfer efficiency. Heat transfer efficiency degradation can be determined by a decrease in heat transfer coefficient, which can be deduced from temperature and flow measurement on the inlet and outlet of the heat exchanger 510, 710, 810 and heat source 590, 790, 890; a method known to those skilled in the art of heat exchangers. A decreased heat transfer coefficient indicates heat exchanger scaling. Indication of scaling of the bulk tank pump 508, 708, 808, heat exchanger 510, 710, 810, or heat pump condenser 811, as determined by the measurements described, can be used to initiate the pipework cleaning mode.

Pre-set cleaning times, or performance based process measurements as described above can be used to initiate the cleaning modes. Prior to initiating cleaning operation, the saltwater concentration mode is halted by stopping bulk tank pump 508, 708, 808 and closing bulk tank outlet actuated valve 512, 712, 812. The cleaning operations outlined below can be extended or repeated as required to restore performance of the concentrating system 501, 701, 801.

The humidification zone cleaning mode cleans humidification zone media 524, 724, 824. This mode is beneficially run first since cleaning solution 585, 785, 885 will be less saline and therefore more efficient at cleaning humidification zone media 524, 724, 824. In the embodiment shown in FIG. 9, cleaning solution source 583 is input to cleaning solution tank 580 to provide cleaning solution 585. In the embodiments shown in FIGS. 11 and 12, condensed water vapour 766, 866 produced by dehumidifying device 760, 860 is directed to cleaning solution tank 780, 880 to provide cleaning solution 785, 885 as described below in more detail. In an alternative embodiment (not shown) a mixture of condensed water vapour from the dehumidifying device and cleaning solution from an external source may be used to provide the clean solution. Cleaning solution could be freshwater, saltwater, or a pre-determined mixture optionally including antiscalants for the scaling species present as would be known to those skilled in the art. For example, dilute citric acid may be used to de-scale calcium carbonate, whereas a basic solution may be used to de-scale silica scaling. Generally a freshwater cleaning solution is preferred given the lack of chemical inputs and its increased solubility for scaled matter over saltwater. Cleaning solution 585, 785, 885 in cleaning solution tank 580, 780, 880 is optionally heated by cleaning solution tank heater 581, 781, 881 to a particular temperature set point required to dissolve the scaled matter, but below the temperature compatibility limits of the materials used in the components of the system. For example, cleaning solution 585, 785, 885 may be heated to about 45 to 55 deg C. to increase solubility of scaled components but remain within the temperature limits of exemplar polyvinyl chloride materials. Cleaning solution tank heater 581, 781, 881 draws heat from cleaning solution tank heat source 590, 790, 890. Exemplar cleaning solution tank heat sources 590, 790, 890 include, but are not limited to, electric heat; reject heat from other processes; or other heat sources available. Cleaning solution 585, 785, 885 from cleaning solution tank 580, 780, 880 is pumped by cleaning solution pump 553, 753, 853, along conduit 555, 755, 855, to spray nozzles 588, 788, 888 directed at humidification zone media 524, 724, 824. The embodiments shown allows the cleaning solution exiting humidification zone media 524, 724, 824 to enter bulk tank 504, 704, 804 as opposed to returning to cleaning solution tank 580, 780, 880. This ensures that fresh cleaning solution is always used to clean humidification zone media 524, 724, 824, however in alternative embodiments other arrangements are possible. Cleaning solution pressure and flow are matched to spray nozzle 588, 788, 888 design, which may be based on a low flow at a high pressure in order to minimize water addition to the solution concentrating system but maximize abrasive action through pressure. Exemplar pressures and flows may be up to 600 kPa and 1 liter per minute per nozzle. Bulk tank return actuated valve 535 should be closed to prevent backflow of cleaning solution to the saltwater concentrating circuit.

The pipework cleaning mode may consist of the two operation modes as follows:
  a. Pipework closed loop cleaning mode: warm cleaning solution is circulated through the pipework for a set period of time, for example ten minutes, to allow for sufficient de-scaling; the cleaning solution will be salinated with time;
  b. Pipework cleaning solution discharge mode: the now spent and salinated cleaning solution is drained from cleaning solution tank 580, 780, 880;

The pipework closed loop cleaning mode cleans bulk tank pump 508, 708, 808 sensors 503, 703, 803, heat exchanger 510, 710, 810 and heat pump condenser 811. This mode is beneficially run after the humidification zone cleaning mode since cleaning solution 585, 785, 885 will be salinated during the pipework closed loop cleaning operation described below. Nevertheless, the pipework cleaning mode can be run at any time as required by either a pre-set timer, operator intervention, or by control system decisions based on the sensed need for pipework de-scaling.

In pipework closed loop cleaning mode (a) bulk tank outlet actuated valve 512, 712, 812 is closed. Cleaning solution 585, 785, 885 is drawn from cleaning solution tank 580, 780, 880 through the open cleaning tank outlet actuated valve 582, 782, 882, pumped by bulk tank pump 508, 708, 808, past sensors 503, 703, 803, through heat exchanger 510, 710, 819, and heat pump condenser 811 and then returned to cleaning tank 580, 780, 880 through the open cleaning tank return actuated valve 586, 786, 886. Over the duration of the pipework closed loop cleaning mode operation, cleaning solution 585, 785, 885 becomes increasingly saline.

Once a preset pipework closed loop cleaning mode time is reached, the pipework cleaning solution discharge mode (b) is initiated. The pipework cleaning solution discharge mode (b) is similar to pipework closed loop cleaning mode (a) with the exception that cleaning tank return actuated valve 586, 786, 886 is closed and bulk tank return actuated valve 535, 735, 835 is opened. Pipework cleaning solution discharge mode (b) is continued until cleaning solution 585, 785, 885 in cleaning solution tank 580, 780, 880 is substantially drained to bulk tank 504, 704, 804 removing the salinated cleaning solution. The solution concentrating circuit can then process the waste cleaning solution. Alternatively, the cleaning solution tank 580, 780, 880 may be drained to an external waste collection system. Cleaning solution tank 580, 780, 880 may now be refilled with cleaning solution source 583 and/or condensed water vapour 766, 866 and any of the cleaning modes repeated as required. Table 3 below summarizes actuated valve operating position for each operating mode.

TABLE 3

Operation positions for actuated valves for system operating modes

| Operation Mode | Actuated Valve | | | | |
|---|---|---|---|---|---|
| | Bulk tank outlet actuated valve 512, 712, 812 | Humidification device actuated valve 509, 709, 809 | Bulk tank return actuated valve 535, 735, 835 | Cleaning tank outlet actuated valve 582, 782, 882 | Cleaning tank return actuated valve 586, 786, 886 |
| Saltwater concentrating mode | Open | Open | Closed | Closed | Closed |
| Cleaning mode: humidification zone | N/A | N/A | Closed | N/A | N/A |
| Cleaning mode: pipework closed loop | Closed | Closed | Closed | Open | Open |

TABLE 3-continued

Operation positions for actuated valves for system operating modes

| Operation Mode | Actuated Valve | | | | |
| --- | --- | --- | --- | --- | --- |
| | Bulk tank outlet actuated valve 512, 712, 812 | Humidification device actuated valve 509, 709, 809 | Bulk tank return actuated valve 535, 735, 835 | Cleaning tank outlet actuated valve 582, 782, 882 | Cleaning tank return actuated valve 586, 786, 886 |
| Cleaning mode: pipework solution discharge | Closed | Closed | Open | Open | Closed |

Additional cleaning modes which may be operated in the cleaning mode of operation include system flush mode and slug wash mode. System flush mode is activated at system shutdown in order to flush the pump 508, 708, 808 and pipework and prevent crystallization in pump 508, 708, 808 and pipework during standstill. Slug wash mode is activated at increased pump loads to provide a low volume de-scaling freshwater slug in order to clean the pump impeller and pipework. In system flush mode: cleaning tank outlet actuated valve 582, 782, 882 and cleaning tank return actuated valve 586, 786, 886 are opened; bulk tank outlet actuated valve 512, 712, 812 and humidification device actuated valve 509, 709, 809 are closed; and pump 508, 708, 808 is activated for a set time (exemplar 60 seconds) to flush the salt solution 505, 705, 805 from the pump 508, 708, 808 and pipework prior to shut-down. In slug wash mode: cleaning tank outlet actuated valve 582, 782, 882 is opened and bulk tank outlet actuated valve 512, 712, 812 immediately closed; a time delay is user set (exemplar 10 seconds); then bulk tank outlet actuated valve 512, 712, 812 is opened and cleaning tank outlet actuated valve 582, 782, 882 immediately closed.

The salt water concentrating system 701, 801 shown in FIGS. 11 and 12, have addition sub-systems:

Solids collection circuit: solids precipitated in cone shaped bulk tank 704, 804 and collected using collection device (not shown);

Condensed water production circuit: condenses water from warm moist air 729, 829 leaving humidifying device 720, 820 using dehumidifier 770, 870.

The salt water concentrating system 801 shown in FIG. 12, also has the addition sub-system:

Heat pump circuit 872: captures heat from warm moist air 829 exiting from humidifying device 820 and upgrades it to heat the salt solution 805 in heat pump condenser 811.

In the solids collection circuit, the cooled, concentrated salt solution passes into smooth bottomed collection basin 726, 826, which may have a small retained volume to minimize heat loss of the retained solution to atmosphere, and then passes into the cone shaped bulk tank 704, 804. A deflection plate (not shown) may be mounted under, but a distance from, the salt solution inlet into bulk tank 704, 804. The deflection plate beneficially prevents disturbance of the salt collecting in the base of the cone shaped bulk tank 704, 804. If the salt solution reaches saturation due to the removal of water and cooling, salts will form. Heavier salt particles fall to the base while the lower density and less saturated solution rises and exits via the outlet through action of pump 708, 808 and re-circulates through the solution concentrating circuit. The system is designed for temperature stratification and hydraulics such that salts form in the cooler, stiller, base of cone shaped bulk tank 704, 804.

Precipitated salts collecting in the bottom of cone shaped bulk tank 704, 804 pass into conduit 731, 831. The precipitated salts may be collected using an auger assembly as shown in FIG. 8, a filter belt as shown in FIG. 1 or some other means of collection. If needed for matters of maintenance or for collection of salts, cone shaped bulk tank 704, 804 and conduit 731, 831 can be purged into collection bin 737, 837 by opening purge valve 733, 833. Purging of cone shaped bulk tank 704, 804 and conduit 731, 831 may be required in the event of routine cleaning or to clear a blockage resulting from excessive scaling.

The solids collection circuit may optionally include an electrically driven precipitation promoter unit 771, 871 that induces dissolved salt to precipitate into larger crystals thereby increasing the efficiency of salt extraction. Precipitation promoter unit 771, 871 is connected to a power supply 773, 873 and attached to conduit 731, 871 or other locations where increased precipitation is desirable. Exemplar precipitation promoter units 771, 871 may include, but are not limited to, solenoid-induced molecular agitation devices employing a solenoid coil carrying an oscillating electric field and wrapped around the pipe in which increasing precipitation is desired.

In the condensed water production circuit, warm moist air exhaust 729, 829 produced as a result of evaporation of water from salt solution 705, 805 to air 750, 850 in the humidification device 720, 820, is passed through to dehumidifying device 760, 860 under action of an optional fan 764, 864. Fan 764, 864 may be removed if fan 725, 825 is sufficiently sized to induce the required air flow.

In the embodiment shown in FIG. 11, the dehumidifying device 760 includes a dehumidifier 770. Dehumidifier 770 may be an evaporator or any other device which condenses water from the warm moist air exhaust 729, for example a condensing heat exchanger, such as aluminum finned tubes or the like. Input dehumidifier fluid 745, which may be a refrigerant or other fluid such as water or coolant, enters the dehumidifier 770. The temperature of input fluid 745 is lower than the wet bulb temperature of the moist air exhaust 729 plus an additional margin to allow for heat transfer resistance. As a result, water vapour condenses from the humidifying device moist air exhaust 729 in contact with the external surface of the dehumidifier 770. As water vapour condenses, the latent heat of condensation is transferred to the fluid inside the dehumidifier 770, such that output fluid 748 leaving the dehumidifier 770 is at a higher temperature than the temperature of the input fluid 745. The heat from output fluid 748 may be used as a heat source, such as heat source 790 or may be dumped before the fluid is recycled back to the dehumidifier 770.

In the embodiment shown in FIG. 12, the dehumidifying device 860 includes a heat pump refrigerant evaporator 870. Inside the heat pump refrigerant evaporator 870 refrigerant evaporates at a temperature lower than the wet bulb temperature of the air plus an additional margin to allow for heat transfer resistance. As a result, water vapour condenses from the humidifying device moist air exhaust 829 in contact with the external surface of the heat pump refrigerant evaporator 870. As water vapour condenses, the latent heat of condensation is transferred to the refrigerant inside the heat pump refrigerant evaporator 870.

Refrigerant gas passes from the heat pump refrigerant evaporator 870 to heat pump compressor 874. Heat pump compressor 874 compresses the refrigerant gas to a sufficient pressure that will enable condensation of the refrigerant in the heat pump condenser 811 at a temperature greater than the salt solution 805 inside the heat pump condenser 811. This results in condensation of the refrigerant inside the tubes of the heat pump condenser 811, transferring the refrigerant's latent heat of condensation to heat the salt solution 805 before it enters the humidifying device 820. Condensed liquid refrigerant passes through an expansion device 878 which lowers the pressure from the high to the low pressure side of the heat pump cycle allowing low pressure refrigerant to enter the evaporator. Beneficially, the net result is that the latent heat from the condensing exhaust moist air 829 in contact with refrigerant evaporator 870 is upgraded to a higher temperature and recycled to heat salt solution 805 before it enters the humidifying device 820, thereby reducing or eliminating the system net heat input required from heat source 890 in the main heat exchanger 810 while also producing condensed water vapour 866 that may be put to a secondary beneficial use.

Exemplar heat pump compressors include, but are not limited to, standard refrigeration system piston or screw compressors sized to match the heat pumps' evaporator and condenser operating pressures and flow rates. The refrigerant evaporator 870 is exposed to the moist air exhaust 829 which is less corrosive than other heat transfer surfaces in the system that are exposed to the salt solution 805, therefore, exemplar refrigerant evaporator 870 materials may be, copper, cupric-nickel, or titanium. Exemplar refrigerants include, but are not limited to, R410A or R134a. The heat pump condenser 811 is exposed to the corrosive salt solution 805 and therefore should be designed for corrosion resistance. Exemplar heat pump condensers 811 include, but are not limited to, tube-in-tube polyethylene heat exchangers or titanium plate and frame heat exchangers. An exemplar refrigerant expansion valve 378, may include, but is not limited to, thermostatic expansion valves controlled based on the temperature of refrigerant exiting the evaporator. The heat pump circuit 872 may be cycled on or off based on the availability of heat from heat source 890, measured as the salt solution 805 temperature after valve 809.

To facilitate the heat pump circuit 872 shown in FIG. 12, an air duct (not shown) may be provided to circulate air 850 exiting the dehumidifying device 860 back into the humidifying device 820. The degree of open versus closed loop is adjusted by controllable inlet louver or vent 815 and outlet louver or vent 817. As described above with reference to the embodiment shown in FIG. 7, the duct operating temperature may be adjusted up or down by reducing or increasing moist air discharge by closing or opening the louvers respectively. This will enable control of the air duct temperature, thereby controlling the temperature of the heat pump refrigerant evaporator 870. Controlling the temperature of the heat pump evaporator 870 enables control of the refrigerant saturation temperature and refrigerant pressure difference across the heat pump compressor 874.

The heat pump condenser 811 and heat pump refrigerant evaporator 870 may be operated at as close temperature as possible, within limits of material temperature compatibility and compressor allowable operating range. Beneficially this improves energy efficiency by maximizing the coefficient of performance of the heat pump cycle. The minimum allowable temperature difference between the heat pump condenser 811 and heat pump refrigerant evaporator 870 results from the minimum allowable pressure difference across the heat pump compressor 874 to prevent suction liquid slugs while maintaining tolerable mechanical loads on compressor components. Operating at or near this minimum allowable temperature difference minimizes compressor power consumption per unit of water evaporated and condensed by maximizing the coefficient of performance (COP) of the heat pump cycle. Maximizing the COP translates into minimizing the units of mechanical energy input to the compressor shaft to move one unit of heat energy from the heat pump refrigerant evaporator 870 to the heat pump condenser 811, with each unit of heat proportional to units of water evaporated and condensed.

It is beneficial to operate the heat pump compressor 874 at the compressor manufacturer's minimum stated pressure difference across the compressor, which will minimize the difference between the condenser refrigerant saturation temperature and the evaporator refrigerant saturation temperature. This way the compressor is kept within manufacturer specified limits of minimum pressure difference across the machine, thereby resulting in minimization of the temperature difference between the heat pump condenser 811 and heat pump refrigerant evaporator 870, which translates into energy efficiency as discussed above.

Condensed water vapour 766, 866 is captured in basin 767, 867 and may be output from the plant by opening water output valve 714, 814 and closing clean-in-place input valve 738, 838. Alternatively, the condensed water vapour 766, 866 may be added to cleaning solution tank 780, 880 to make up clean-in-place solution 785, 885 by closing water output valve 714, 814 and opening clean-in-place input valve 738, 838. Recycling the condensed water vapour 766, 866 back to clean-in-place tank 780, 880 beneficially minimizes the amount of water that needs to be added to the system.

The dehumidifying device 760, 860 can include an optional demister 765, 865 that entrains any water droplets carried over to prevent loss to the environment. In an alternative embodiment (not shown), the air flow may be orientated in vertical rather than horizontal configuration. Also the air flow in humidifying device 720, 820 may be oriented horizontally with vertical air flow in dehumidifying device 760, 860, providing the benefit of additional demisting as condensed vapour droplets will tend to fall out of the air flow as it turns from a horizontal to a vertical path. Optional humidification device inlet louvers 721, 821 direct air into the humidification zone media 724, 824 and can be closed to prevent splashing of saltwater out of the humidification device air inlet when the fan 725, 825 is not on during cleaning.

The embodiments shown in FIGS. 2 and 12 utilize an air humidification-dehumidification (HDH) effect to produce condensed water and to transfer heat of condensation to the solution to be concentrated before it enters the humidification device. In an alternative embodiment for concentrating saltwater solutions multiple air humidification-dehumidification (HDH) effects may be utilized. When a singe HDH effect is utilized as described above with reference to FIGS. 2 and 12, a heat pump evaporator placed downstream of the humidification stage warm moist discharge air stream provides a heat exchange surface cooler than the wet bulb temperature of the air stream, thereby enabling condensation of moisture from the air on the outside of the evaporator tubes. Condensation of moisture produces freshwater and latent heat of condensation. The latent heat of condensation of the moisture is transferred to the heat pump refrigerant as it evaporates inside the evaporator tubes. The low pressure heat pump refrigerant gas is then compressed in a compressor in order to upgrade its latent heat of condensation to a higher temperature. The high pressure refrigerant is discharged to a condenser wherein the refrigerant condenses and releases its heat of condensation at a higher temperature, heating the saltwater before it enters the humidification stage.

High pressure liquid refrigerant is produced in the condenser and may be expanded to a lower pressure through an expansion device, such as a thermostatic expansion valve, electronically controlled expansion valve, or a capillary tube. The lower pressure refrigerant then re-enters the evaporator. The heat pump closed loop refrigerant cycle is completed with the refrigerant evaporating in the evaporator tubes. In sum, the heat pump cycle captures the latent heat of the condensing moisture from the dehumidification stage and upgrades it to warm the saltwater before it enters the humidification stage.

As described above, fully closed air loop concentrators operate at saturated air conditions, with a humidity ratio of 1. Humidity ratio is defined as the mass of water vapour in a volume of air relative to the potential mass of water vapour at fully saturated conditions. In a fully closed loop concentrator, the humidity ratio remains 1 as the air stream passes through the humidification and dehumidification stages. As the air stream is heated in the humidifier by the warm inlet saltwater its temperature and ability to hold vapour increases. As the air stream is cooled in the dehumidification stage by the cooler refrigerant fluid inside the heat pump evaporator, the air's ability to hold vapour decreases and it moisture condenses on the cooler tubes.

From a saltwater processing capacity standpoint, it is beneficial to operate a closed loop heat pump driven solution concentrator at as high temperature as possible. This is because warm air can hold more moisture per unit volume than cooler air, as described above. Inlet and outlet air vents or louvers enable closed loop air duct temperature control. In a fully closed and perfectly insulated air loop arrangement the heat power input into the air loop (condenser heat power=evaporator heat power+compressor power) exceeds heat extracted from the air loop (evaporator heat power). More specifically, the compressor heat power is not discharged from the system and as a result the air loop temperature rises. Inlet and outlet vents are regulated to exhaust warm air and intake cooler air in order to control air loop temperature, beneficially aiming for a higher temperature to increase capacity, or for the heat pump system's most efficient operating temperature. The inlet and outlet vents also provide a discharge mechanism of any unwanted gases such as hydrocarbon vapours that could be present in the saltwater, optionally through media that absorbs the hydrocarbon vapours such as activated carbon. Alternatively, the inlet and outlet vents or louvers could be removed and replaced with a heat exchanger that discharges air loop heat without exhausting air.

Through a series of models, experiments and prototypes the following was discovered:

An approximate 15 deg C. temperature difference between the temperature of the warm saltwater entering the humidifier and the temperature of the heat pump refrigerant in the dehumidifier stage is required for effective condensation of moisture. Higher temperature differences result in increased freshwater production capacity;

Most heat pump compressors known in the art are best operated when the condenser refrigerant saturation temperature is 30 deg C. or higher than the evaporator refrigerant saturation temperature. Some compressor manufacturers specify a minimum saturation temperature difference; others specify a minimum pressure difference. Regardless, the specified difference of at least 30 deg C. ensures that the low pressure refrigerant gas entering the compressor suction does not include liquid refrigerant slugs, which could damage the compressor;

The heat pump compressor 30 deg C. minimum temperature difference stated above reduces energy efficiency since, the heat pump cycle must operate at the optimal 30 deg C. minimum temperature difference, however only a 15 deg C. minimum temperature difference is actually required.

In order to overcome these shortcomings, while also beneficially increasing saltwater concentrating capacity for the same size heat pump system, multiple air humidification-dehumidification (HDH) effects may be utilized. In this embodiment, the top temperature heat source is provided by a heat pump condenser and the bottom temperature heat sink is provided by the heat pump evaporator.

Figure 10:
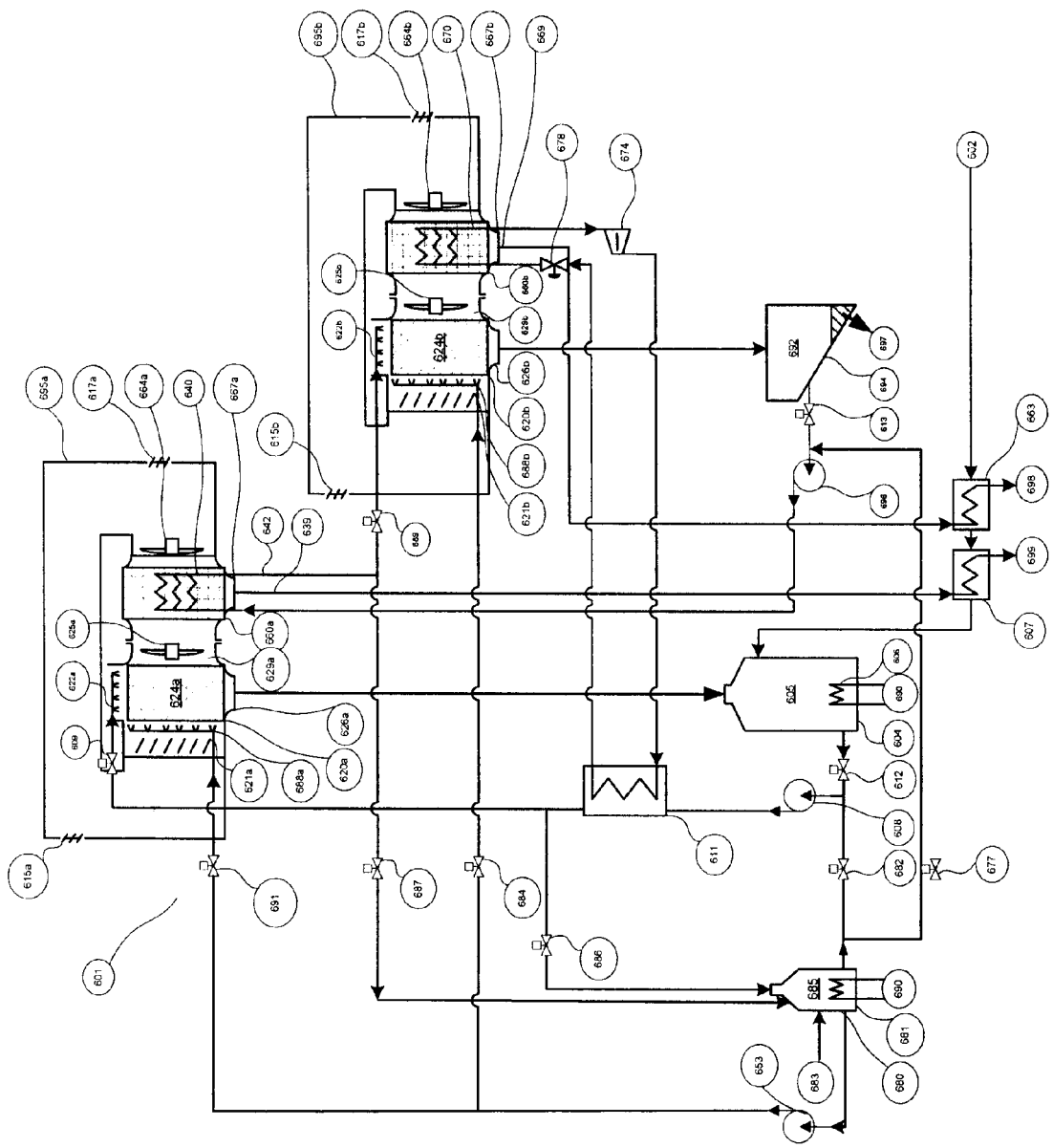
FIG. 10 is a schematic view of a solution concentrating system with multiple air humidification-dehumidification (HDH) effects with heat recovery and condensed water production according to an embodiment.
Figure 13:
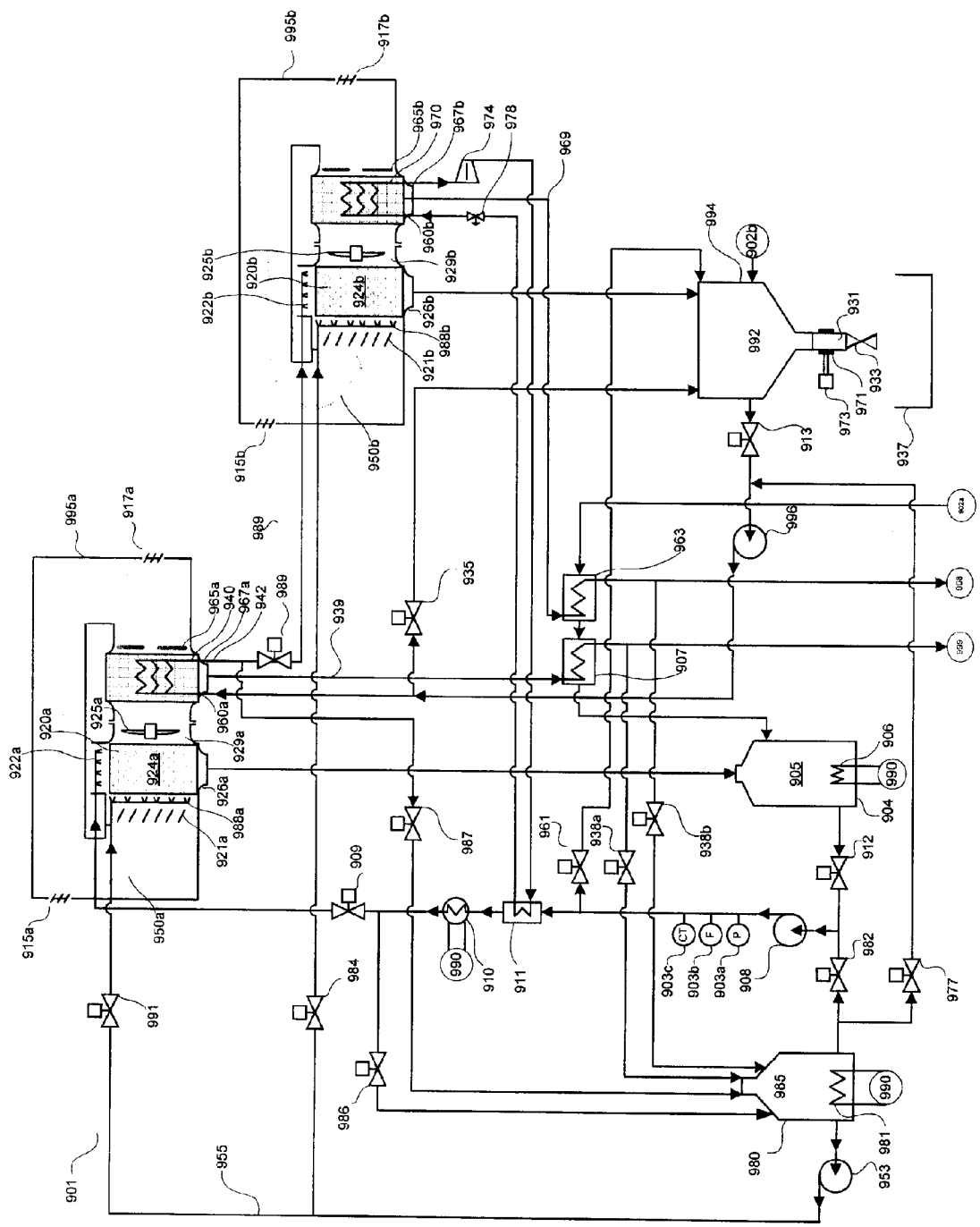
FIG. 13 is a schematic view of a solution concentrating system with multiple air humidification-dehumidification (HDH) effects with heat recovery and condensed water production according to an alternative embodiment.

With reference to FIGS. 10 and 13, there is shown a solution concentrating plant 601, 901, using multiple air HDH effects which consists of four sub-systems:

1. First HDH effect saltwater concentrating circuit: including first effect tank 604, 904, first effect pump 608, 908, and first effect humidifier 620a, 920a;
2. Second HDH effect saltwater concentrating circuit: including second effect tank 694, 994, second effect pump 696, 996, and second effect humidifier 620b, 920b; second effect saltwater 692, 992 being lower in temperature than first effect saltwater 605, 905;
3. Heat pump circuit: captures heat from second effect dehumidification stage heat pump evaporator 670, 970 and upgrades it to heat the first effect saltwater 605, 905 in heat pump condenser 611, 911;
4. Optional clean-in-place circuit: periodically de-scales and cleans pumps 608, 908, 696, 996, heat pump condenser 611, 911, first effect radiator 640, 940, and evaporative tower packing 624a, 924a, 624b, 924b.

The saltwater concentrating circuit accepts make-up saltwater 602, 902a from an upstream process into first effect tank 604, 904 after optionally being pre-heated by respective optional first and second effect condensed freshwater heat exchangers 607, 907 and 663, 963. First effect tank 604, 904 may include an optional heater element 606, 906 supplied by heat source 690, 990, which warms the bulk salt solution 605, 905 prior to pumping. The optional heater element 606, 906 beneficially reduces the likelihood of precipitation in downstream process pipework. First effect salt solution 605, 905 exits bulk tank 604, 904 via an outlet and passes through a normally open first effect tank actuated valve 612, 912. The optional clean-in-place first effect tank valve 682, 982 is normally closed. In one embodiment as shown in FIG. 13, the first effect salt solution 905 passes through pressure sensor 903a, flow sensor 903b, and conductivity sensor 903c, collectively "sensors" 903. One of each pressure sensor 903a, flow sensor 903b, and conductivity sensor 903c are shown; however, they may be optionally removed or additional sensors may be employed as specified by the designer. For example, temperature sensors (not shown) could be added on the inlet and outlet of heat exchanger 910. First effect pump 608, 908 pumps the salt solution 605, 905 through the heat pump condenser 611, 911 where the salt solution 605, 905 is heated by condensing high pressure refrigerant to a temperature roughly 1-10 deg C. higher than the wet bulb temperature of the air entering the first effect humidifier 620a, 920a. Exemplar heat pump condenser 611, 911 can include, but are not limited to titanium plate and frame units. An additional heat pump exchanger 910 heated by heat source 990 may be included in the first effect solution flow path as shown in FIG. 13 to provide additional or alternative heating of first effect solution 905.

The warm first effect salt solution 605, 905 passes through the normally open first effect evaporative tower input valve 609, 909 and then enters the first effect humidifier 620a, 920a via distribution header 622a, 922a. The optional clean-in-place first effect recirculation valve 686, 986 is normally closed. The warm first effect salt solution 605, 905 drips through first effect humidification packing 624a, 924a in the first effect humidifier 620a, 920a, while fan 625a, 925a moves air through the packing 624a, 924a, promoting transfer of water to air. Water from the first effect salt solution 605, 905 evaporates to the air as the solution's temperature is higher than the wet bulb temperature of the air—a well known property of psychometrics. As a result, warm moist first effect air exhaust 629a, 929a is produced while the first effect salt solution 605, 905 is cooled through loss of heat of vaporization and concentrated through loss of water. The cooled, concentrated salt solution collects in first effect collection basin 626a, 926a and returns to the first effect tank 604, 904, which may include an optional strainer or filter (not shown) to remove any debris. The first effect humidifier 620a, 920a is similar in construction to a cooling tower, which is known to those skilled in the art, but may be constructed from non-corrosive fibreglass shell, plastic packing materials such as polyvinyl chloride or polyethylene, and alloyed steel or stainless steel hardware to prevent corrosion issues.

First effect evaporative tower moist air exhaust 629a, 929a passes through first effect dehumidification stage 660a, 960a. An optional fan 664a adjacent the dehumidification stage 660a (as shown in FIG. 10) may be included to induce the required air flow if required. Fan 664a may be removed if evaporated tower fan 625a is sufficiently sized to induce the required air flow. The first effect dehumidification stage 660a, 960a includes the first effect radiator 640, 940. The first effect radiator 640, 940 may include optional finned tubes for enhanced heat transfer. Second effect salt water 692, 992 flows inside the tubes of the first effect radiator 640, 940. The second effect salt water 692, 992 is cooler than the first effect moist air exhaust 629a, 929a, thereby enabling heat transfer, resulting in condensation of the first effect moist air exhaust 629a, 929a and transfer of latent heat of condensation of the moisture to heat the second effect saltwater 692, 992. This condensation of moisture results in first effect freshwater 699, 999, which is captured in first effect dehumidifier basin 667a, 967a and delivered through first effect freshwater conduit 639, 939 to condensed freshwater heat exchanger 607, 907. As shown in FIG. 13, the first effect dehumidifying device 960a can include an optional demister 965a that entrains any water droplets carried over to prevent loss to the environment.

In the embodiment shown in FIG. 13, the first effect freshwater 999 may be output from the plant by closing first effect freshwater clean-in-place input valve 938a. Alternatively, the first effect freshwater 999 may be added to cleaning solution tank 980 to make up clean-in-place solution 985 by opening first effect freshwater clean-in-place input valve 938a. Recycling the first effect freshwater 999 to clean-in-place tank 980 beneficially minimizes the amount of water that needs to be added to the system.

The second effect process arrangement is substantially similar to the first effect, with the exception that first effect radiator 640, 940 is replaced with the second effect heat pump evaporator 670, 970. The second effect saltwater 692, 992 is drawn from second effect tank 694, 994 via an outlet and passes through normally open second effect tank actuated valve 613, 913. The outlet may be positioned to prevent egress of solids, such as a long horizontal pipe internal to the tank with top slots and a baffle above the slots to deflect solids from the pump inlet (not shown). An optional clean-in-place second effect tank valve 677, 977 is normally closed.

Second effect pump 696, 996 pumps the second effect salt solution 692, 992 through the first effect radiator 640, 940 inside the radiator tubes, where second effect salt solution 692, 992 is heated as described above. The warm second effect salt solution 692, 992 exiting first effect radiator 640, 940 passes along conduit 642, 942 to the second effect distribution header 622b, 922b through normally open actuated valve 689, 989. The optional clean-in-place second effect recirculation valve 687, 987 is normally closed.

The warm second effect salt solution 692, 992 drips through the humidification packing 624b, 924b in the second effect humidifier 620b, 920b while second effect fan 625b, 925b moves air, promoting mass transfer of water to air. As a result, second effect warm moist air exhaust 629b, 629b is produced while the salt solution 692, 992 is cooled through loss of heat of vaporization and concentrated through loss of water. The cooled, concentrated salt solution 692, 992 collects in second effect collection basin 626b, 926b and is returned to the second effect tank 694, 994, which may include an optional strainer or filter (not shown) to remove any debris.

In the embodiment shown in FIG. 10, salts 697 precipitated in second effect tank 694 may be collected using an auger assembly as shown in FIG. 8, a filter belt as shown in FIG. 1 or some other means of collection.

In the embodiment shown in FIG. 13, bulk tank 994 may have a bottom portion which is cone shaped to aid salt participation. A deflection plate (not shown) may be mounted under, but a distance from, the salt solution inlet into bulk tank 994. The deflection plate beneficially prevents disturbance of the salt collecting in the base of the cone shaped bulk tank 994. If the salt solution reaches saturation due to the removal of water and cooling, salts will form. Heavier salt particles fall to the base while the lower density and less saturated solution 992 rises and exits via the outlet through action of pump 996 and re-circulates through the solution concentrating circuit. Make-up saltwater 902b from an upstream process may also be added into second effect tank 994 to make up second effect saltwater 992. The system is designed for temperature stratification and hydraulics such that salts form in the cooler, stiller, base of cone shaped bulk tank 994. Precipitated salts collecting in the bottom of cone shaped bulk tank 994 pass into conduit 931. The precipitated salts may be collected using an auger assembly as shown in FIG. 8, a filter belt as shown in FIG. 1 or some other means of collection. If needed for matters of maintenance or for collection of salts, collection cone shaped bulk tank 994 and conduit 931 can be purged into collection bin 937 by opening purge valve 933. Purging of cone shaped bulk tank 994 and conduit 931 may be required in the event of routine cleaning or to clear a blockage resulting from excessive scaling. Conduit 931 may include an electrically driven precipitation promoter unit 971 that induces dissolved salt to precipitate into larger crystals thereby increasing the efficiency of salt extraction. Precipitation promoter unit 971 is connected to a power supply 973 and attached to conduit 931 or other locations where increased precipitation is desirable. Exemplar precipitation promoter units 971 may include, but are not limited to, solenoid-induced molecular agitation devices employing a solenoid coil carrying an oscillating electric field and wrapped around the pipe in which increasing precipitation is desired. Once the first effect saltwater concentrating circuit has been run for a set period of time, the first effect salt solution 905 in the first effect tank 904 will become concentrated. The concentrated first effect salt solution 905 may be periodically drained from first effect bulk tank 904 into second effect bulk tank 994 by opening bulk tank transfer valve 961 and closing first effect humidifying device input valve 909. Transferring the concentrated first effect salt solution 905 into the second effect bulk tank 994 enables salts to be participated and collected from the concentrated first effect salt solution as described above.

The second effect moist air exhaust 629b, 929b is passed over the second effect heat pump evaporator 670, 970 in the second effect dehumidification stage 660b, 960b. The heat pump evaporator 670, 970 provides a heat exchange surface cooler than the wet bulb temperature of the moist air exhaust 629b, 929b air stream, leading to condensation of moisture from the air on the outside of the evaporator tubes. Condensation of moisture enables recovery of freshwater and the moist air's latent heat of condensation, which is transferred into the heat pump refrigerant as it evaporates inside the tubes of the heat pump evaporator 670, 970. The low pressure heat pump refrigerant gas is then compressed in heat pump compressor 674, 974 in order to upgrade its latent heat of condensation to a higher temperature. The high pressure refrigerant is discharged to condenser 611, 911 where the refrigerant condenses and releases its heat of condensation at a higher temperature; thereby heating the first effect saltwater 605, 905 in the condenser 611, 911 before it enters the first effect humidifier 620a, 920a. High pressure liquid refrigerant is produced in the condenser 611, 911 and then expanded to a lower pressure by passing through an expansion device 678, 978. The low pressure refrigerant then re-enters the second effect evaporator 670, 970 and evaporates, capturing the latent heat of the condensing moisture in the second effect dehumidification stage 660b, 960b. The second effect dehumidification stage 660b, 960b produces second effect freshwater 698, 998, which is captured in second effect dehumidifier basin 667b, 967b and delivered through second effect freshwater conduit 669, 969 to condensed freshwater heat exchanger 663, 963. As shown in FIG. 13, the dehumidification stage 960b may include an optional demister 965b that entrains any water droplets to prevent carry over.

In the embodiment of FIG. 13, the second effect freshwater 998 may be output from the plant by closing second effect freshwater clean-in-place input valve 938b. Alternatively, the second effect freshwater 998 may be added to cleaning solution tank 980 to make up clean-in-place solution 985 by opening second effect freshwater clean-in-place input valve 938b. Recycling the second effect freshwater 998 to clean-in-place tank 980 beneficially minimizes the amount of water that needs to be added to the system.

The first and second HDH effect systems include optional open-closed loop air ducts 695a, 995a and 695b, 995b respectively for recirculation of air 950a, 950b. Increasing the first effect fan 625a, 925a speed and pump 608, 908 flow rate will lower the temperature difference between the first and second effect. The higher first effect pump flow rate will lower the temperature difference between the first effect saltwater entering and exiting the first effect humidifier 620a, 920a. Increasing fan speed will increase mass flow of air, leading to warmer exhaust air from first effect humidifier 620a, 920a, resulting in warmer second effect saltwater entering conduit 642, 942 on its way to second effect distribution header 622b, 922b. As a result, the temperature difference between the effects and under which the heat pump must be operated can be increased or decreased respectively by decreasing or increasing fan speed and pump flow rate to a respective narrowing or widening of the temperature difference between effects.

The degree of open versus closed loop is adjusted by controllable inlet louver or vent 615a, 915a, 615b, 915b and outlet louver or vent 617a, 917a, 617b, 917b. As described above with reference to the embodiment shown in FIG. 7, the duct operating temperature may also be adjusted up or down by reducing or increasing moist air discharge by closing or opening the louvers respectively. This will enable coarse control of first and second effect air duct temperature to achieve an operating temperature, after which fan and pump speed control may be used to finely tune duct temperature, with the combination of both control means enabling control of the temperature of the first effect radiator 640, 940 and second effect heat pump evaporator 670, 970. Controlling the temperature of the first effect radiator 640, 940 controls the temperature of the heat pump condenser 611, 911, which combined with control of the temperature of the second effect heat pump evaporator 670, 970, enables control of the refrigerant saturation temperature and refrigerant pressure difference across the heat pump compressor 674, 974.

As described above, compressor manufacturers will specify a minimum refrigerant saturation temperature difference or pressure difference across the compressor in order to protect the compressor from damaging liquid refrigerant slugs. From an energy efficiency standpoint, it's preferable to operate the compressor at as low pressure difference as the process and compressor allows. This increases the coefficient of performance (COP) of the heat pump cycle. COP for heat pumps is the ratio of heat power discharged in the condenser to the compressor power, a well know performance parameter known to those skilled in the art of heat pump and refrigeration cycles. By controlling and reducing the temperature difference between the first and second effect as described above, the operator can minimize compressor differential pressure but maintain it above the manufacturer specified minimum. Therefore, the operator can minimize compressor power, maximize COP, and thereby maximize the energy efficiency of the two effect heat pump driven concentrating system.

The heat pump condenser 611, 911 and heat pump refrigerant evaporator 670, 970 may be operated at as close temperature as possible, within limits of material temperature compatibility and compressor allowable operating range. Beneficially this improves energy efficiency by maximizing the coefficient of performance of the heat pump cycle. The minimum allowable temperature difference between the heat pump condenser 611, 911 and heat pump refrigerant evaporator 670, 970 results from the minimum allowable pressure difference across the heat pump compressor 674, 974 to prevent suction liquid slugs while maintaining tolerable mechanical loads on compressor components. Operating at or near this minimum allowable temperature difference minimizes compressor power consumption per unit of water evaporated and condensed by maximizing the coefficient of performance (COP) of the heat pump cycle. Maximizing the COP translates into minimizing the units of mechanical energy input to the compressor shaft to move one unit of heat energy from the heat pump refrigerant evaporator 670, 970 to the heat pump condenser 611, 911, with each unit of heat proportional to units of water evaporated and condensed.

It is beneficial to operate the heat pump compressor 674, 974 at the compressor manufacturer's minimum stated pressure difference across the compressor, which will minimize the difference between the condenser refrigerant saturation temperature and the evaporator refrigerant saturation temperature. This way the compressor is kept within manufacturer specified limits of minimum pressure difference across the machine, thereby resulting in minimization of the temperature difference between the heat pump condenser 611, 911 and heat pump refrigerant evaporator 670, 970, which translates into energy efficiency as discussed above.

The optional clean-in-place system periodically de-scales the pumps, heat exchangers, and evaporative tower packing. Hot freshwater, in the range of 45 deg C. may be used as clean-in-place solution. Clean-in-place freshwater supply 683 may be supplied externally (as shown in FIG. 10) or could be provided by diverting one or both of first effect freshwater 999 and second effect freshwater 998 to clean-in-place tank 980 (as shown in FIG. 13 and described above). The clean-in-place system periodically circulates clean-in-place solution 685, 985 through pumps 608, 908 and 696, 996, condenser 611, 911, heat exchanger 910, and radiator 640, 940 in order to de-scale them. It also sprays clean-in-place solution on packing 624a, 924a, 624b, 924b of both effects in order to de-scale the packing. The clean-in-place solution 685, 985 may be heated with element 681, 981 in tank 680, 980 via heat supply 690, 990. The clean-in-place solution 685, 985 may have acid, base, or anti-scalants added to reduce scaling, depending on the composition of the salt water. If for example the salt water is high in silica, pH can be increased to encourage de-scaling, while if the salt water is high in carbonates, pH can be reduced to encourage de-scaling. Periodic exemplar initiation of the clean-in-place system may be based on:

1. A timer set to past operational needs
2. Increase pump load or vibration
3. Reduced heat transfer in the condenser 611, 911 or radiator 640, 940 as measured relative to decreased temperature differential
4. Increased evaporative tower fan 625a, 925a, 625b, 925b load indicating packing scaling Clean-in-place modes can be broadly categorized into the four categories as given in Tables 4 and 5 below which provide operation of the clean-in-place modes for the embodiments shown in FIGS. 10 and 13 respectively. Prior to activating the specified clean-in-place mode, clean-in-place tank 680, 980 should be sufficiently full to complete the mode and the clean-in-place solution 685, 985 heated to a predetermined set point temperature to enhance cleaning effectiveness.

TABLE 4

Clean-in-place modes of operation for FIG. 10

| Clean-in-place Mode | First HDH Effect System | Second HDH Effect System |
|---|---|---|
| System flush: Activate at system shutdown in order to flush pump and pipework and prevent crystallization in pump and pipework during standstill | 1. Open valves: 682, 686<br>2. Close valves: 612, 609<br>3. Activate pump 608 for set time (exemplar 60 sec) to flush salt solution from pipework prior to shut-down | 1. Open valves: 677, 687<br>2. Close valves: 613, 689<br>3. Activate pump 696 for set time (exemplar 60 sec) to flush salt solution from pipework prior to shut-down |
| Slug wash: Activate at increased pump loads to provide a low volume de-scaling freshwater slug in order to clean the pump impeller and pipework | 1. Open valve: 682<br>2. Immediately close valve: 612<br>3. Time delay user set: exemplar 10 sec<br>4. Open valve: 612<br>5. Immediately close valve: 682 | 1. Open valve: 677<br>2. Immediately close valve: 613<br>3. Time delay user set: exemplar 10 sec<br>4. Open valve: 613<br>5. Immediately close valve: 677 |
| Pipework clean: activate after repeated slug washes or measurement of heat exchange heat transfer deterioration indicating scaling | 1. Open valves: 682, 686<br>2. Close valves: 612, 609<br>3. Activate pump 608 for set time (exemplar 20 mins) to wash pump 608, pipework, and condenser 611<br>Drain tank 680, optionally into tank 605 by opening valve 609 and closing valve 686 while running pump 608 until tank 680 reaches low level | 1. Open valves: 677, 687<br>2. Close valves: 613, 689<br>3. Activate pump 696 for set time (exemplar 20 mins) to wash pump 696, pipework, and radiator 640<br>Drain tank 680, optionally into tank 694 by opening valve 689 and closing valve 687 while running pump 696 until tank 680 reaches low level |
| Packing clean: activate at increased fan load or packing air pressure difference indicating packing scaling | 1. Open valve: 691<br>2. Close valve: 684<br>3. Activate pump 653 for set time (exemplar 60 sec) to direct wash solution 685 to spray nozzles 688a to wash packing 624a | 1. Open valve: 684<br>2. Close valve: 691<br>3. Activate pump 653 for set time (exemplar 60 sec) to direct wash solution 685 to spray nozzles 688b to wash packing 624b |

TABLE 5

Clean-in-place modes of operation for FIG. 13

| Clean-in-place Mode | First HDH Effect System | Second HDH Effect System |
|---|---|---|
| System flush: Activate at system shutdown in order to flush pump and pipework and prevent crystallization in pump and pipework during standstill | 1. Open valve: 982, 909<br>2. Close valve: 912, 986<br>3. Activate pump 908 for set time (exemplar 60 sec) to flush salt solution from pipework prior to shut-down | 1. Open valves: 977, 989<br>2. Close valves: 913, 987, 935<br>3. Activate pump 996 for set time (exemplar 60 sec) to flush salt solution from pipework prior to shut-down |
| Slug wash: Activate at increased pump loads to provide a low volume de-scaling freshwater slug in order to clean the pump impeller and pipework | 1. Open valve: 982<br>2. Immediately close valve: 912<br>3. Time delay user set: exemplar 10 sec<br>4. Open valve: 912<br>5. Immediately close valve: 982 | 1. Open valve: 977<br>2. Immediately close valve: 913<br>3. Time delay user set: exemplar 10 sec<br>4. Open valve: 913<br>5. Immediately close valve: 977 |
| Pipework clean: activate after repeated slug washes or measurement of heat exchange heat transfer deterioration indicating scaling | 1. Open valves: 982, 986<br>2. Close valves: 912, 909<br>3. Activate pump 908 for set time (exemplar 20 mins) to wash pump 908, pipework, heat exchanger 910, and condenser 911<br>Drain tank 980, optionally into tank 905 by opening valve 909 and closing valve 986 while running pump 908 until tank 980 reaches low level | 1. Open valves: 977, 987<br>2. Close valves: 913, 989, 935<br>3. Activate pump 996 for set time (exemplar 20 mins) to wash pump 996, radiator 940, and pipework<br>Drain tank 980, optionally into tank 994 by opening valve 935 and closing valve 987 while running pump 996 until tank 980 reaches low level |

TABLE 5-continued

Clean-in-place modes of operation for FIG. 13

| Clean-in-place Mode | First HDH Effect System | Second HDH Effect System |
|---|---|---|
| Packing clean: activate at increased fan load or packing air pressure difference indicating packing scaling | 1. Open valve: 991<br>2. Close valve: 984<br>3. Activate pump 953 for set time (exemplar 60 sec) to direct wash solution 985 along conduit 955 to spray nozzles 988a to wash packing 924a | 1. Open valve: 984<br>2. Close valve: 991<br>3. Activate pump 953 for set time (exemplar 60 sec) to direct wash solution 985 along conduit 955 to spray nozzles 988b to wash packing 924b |

In the embodiment shown in FIG. 13, clean-in-place solution 985 which has become salinated following pipework clean mode may be drained into second effect tank 994 by opening valve 935 and closing valve 987 while running second effect pump 996 until tank 980 reaches low level. This beneficially allows the salinated clean-in-place solution 985 to be drained to the second effect tank 994 without passing through and contaminating either the first effect or second effect humidification packing 924a, 924b.

The first and second effect evaporative tower packing cleaning spray nozzles 688a, 988a, 688b, 988b direct clean-in-place solution 685, 985, which may be warm low salinity water, at a high pressure and low flow rate at the packing surface 624a, 924a, 624b, 924b to remove attached scaled. A minimal amount of water is beneficially added to the system. Make-up clean-in-place solution 683, which may be freshwater due to its increase solubility action, but could also be saltwater, can be added to the clean-in-place tank 680 based on an actuated valve or float valve. Actuated valves could be automatically actuated in accordance with the above mentioned initiation examples using common air or electric valve actuation systems in accordance with a programmable logic controller (not shown). Optional first effect humidification device inlet louvers 621a, 921a and second effect humidification device inlet louvers 621b, 921b direct air into the first effect packing 624a, 924a and second effect packing 624b, 924b respectively. The inlet louvers 621a, 921a, 621b, 921b can be closed to prevent splashing of saltwater out of the humidification device air inlet when the fan 625a, 925a, 625b, 925b are not on during cleaning.

The embodiment described herein with reference to FIGS. 10 and 13 uses two HOH effect driven solution concentrating system, however in alternative embodiments (not shown) the system may encompass more than two effects where:

The heat pump evaporator is located in the lowest temperature effect's dehumidifying device;

The heat pump condenser heats the saltwater for the highest temperature effect's humidification stage.

In an alternative embodiment, the capacity per unit footprint of the above described system may be increased by using helium rather than air in the air ducts. This would of course entail fully closed and sealed loop operation to prevent egress of helium and ingress of atmospheric air. A heat exchanger between the helium duct and ambient would be required to remove the heat power of the compressor and enable helium loop temperature control.

In an alternative embodiment (not shown), the closed loop air ducts 995a and 995b of FIG. 13 may be joined into a single adjustable closed loop air duct spanning two effects such that air flows through first effect humidification packing 924a under action of fan 925a, across first effect radiator 940, then in series to the second effect humidification packing 924b under action of fan 925b and across second effect evaporator 970 before being returned in a closed loop to first effect humidifier packing 924a. In this embodiment, the single adjustable closed loop air duct has an air outlet louver and air inlet louver positioned between the first effect radiator 940 and second effect humidification packing 924b to allow for control of the temperature of the air passing into the second effect humidification packing 924b, such that the air has a wet bulb temperature lower than the second effect salt solution entering the second effect distribution header 922b. In this embodiment, heat pump compressor power consumption will be higher than the embodiment shown in FIG. 13 however only one duct system is required.

In an alternative embodiment (not shown), which uses a first and second effect saltwater concentrating circuit as shown in FIG. 13, the evaporator 970, compressor 974, condenser 911 and expansion device 978 may be removed and a heat source, such as a heat exchanger 910, may be included in the system to heat the first salt solution before it enter the first humidification device 920a. The second saltwater concentrating circuit may include a humidification device and the warm moist air produced in the humidification device may exhaust to atmosphere. Alternatively, the second saltwater concentrating circuit may include a humidification-dehumidification device combination for concentrating the second salt solution. When a humidification-dehumidification device combination is used in the second circuit, a condensing heat exchanger, such as a radiator may be used in the second effect dehumidification device instead of the evaporator 970. The radiator has a cooling fluid flowing internal to the radiator tubes so that there is condensation of water vapour from the second effect warm moist air exhaust passing over the radiator. Heat of condensation is transferred to the cooling fluid in the radiator and the heated cooling fluid may be cooled by a separate means such as a conventional cooling tower or finned air cooler.

A multiple effect system can be built to beneficially recycle the heat of condensation and reduce the net thermal input. For example, a three effect system would reduce the net thermal input to roughly 220 kWh/m3 since the input heat can be recycled three times. Additional effects will reduce the net thermal input further; however the number of effects is limited by the temperature difference between the hot source temperature and heat rejection temperature, and the temperature difference required internally for each effect. As an example, a first effect may be designed for a temperature difference of 20 degrees between the warm first effect saltwater input to the first effect humidification stage and the subsequent second effect saltwater exiting the first effect condensing heat exchanger. If the system's first effect warm saltwater temperature is 80 deg C. and final rejection occurs at 20 deg C., three effects are possible.

In a multiple effect system, saltwater to be concentrated in a downstream effect is heated by passing the saltwater through a dehumidification device of the next upstream effect before the saltwater enters the humidification device of the downstream effect. The downstream effect operates at temperature lower than the upstream effect. Saltwater passing into a first effect humidification device of a multiple effect system may be heated to a temperature above the wet bulb temperature of gas flowing through the first effect humidification device using a heat exchanger or the like. The heat source may be an external heat source, for example medium grade waste heat reject from an industrial process or solar thermal. Alternatively or additionally, the heat source may be provided by a heat recovery circuit including an evaporator, compressor, condenser and expansion device as described with reference to FIG. 13, where the evaporator is positioned in the dehumidification device of the final effect.

Saltwater circulating through a humidification device of a second effect of the multiple effect system is heated to a temperature above the wet bulb temperature of gas flowing through the second effect humidification device, by passing the saltwater through a condensing heat exchanger in the dehumidification device of the first effect. Water vapour from the warm moist exhaust gas passing over the condensing heat exchanger in the first effect dehumidification device condenses, and the heat of condensation is transferred to the saltwater. Saltwater circulating through a humidification device of a third effect of the multiple effect system is heated to a temperature above the wet bulb temperature of gas flowing through the third effect humidification device, by passing the saltwater through a condensing heat exchanger in the dehumidification device of the second effect. Water vapour from the warm moist exhaust gas passing over the condensing heat exchanger in the second effect dehumidification device condenses, and the heat of condensation is transferred to the saltwater. The saltwater heating process is repeated for a fourth and subsequent effects if present.

The final effect in the multiple effect system operates in a manner similar to the upstream effects however the final effect does not require a dehumidification device and warm moist exhaust gas from the final effect humidification device may be exhausted to atmosphere. Alternatively, the final effect may include a dehumidification device. Heat produced in the final effect dehumidification device must be rejected or recovered. Heat rejection may be provided by input of cooling fluid into a condensing heat exchanger in the final effect dehumidification device to extract the final stage heat of condensation, heating the cooling fluid and rejecting heat from the process. The cooling fluid may be cooled by means known to those skilled in the art, including but not limited to open source liquid cooling such as a water body, radiators rejecting heat to ambient air, and cooling towers. Heat recovery may be provided by a heat recovery circuit including an evaporator, compressor, condenser and expansion device as described with reference to FIG. 13, where the evaporator is positioned in the final effect dehumidification device and heat from condensation of the compressed refrigerant gas is transferred to the saltwater entering the first effect humidification device.

Saltwater may circulate through each of the multiple effects being further concentrated as it passes through the humidification device of each effect. Valves may be used to transfer the circulating saltwater from an upstream effect to a downstream effect. Each valve may be modulated to transfer concentrated saltwater from the upstream effect to the downstream effect at a mass flow rate equal to the difference between the input feed saltwater mass flow rate and the water loss evaporation mass flow rate in the humidification device of the upstream effect. Alternatively, saltwater being concentrated in each effect may be kept separate and may be circulated back to a bulk tank for each effect as shown in FIG. 13. If separate saltwater concentrating circuits are used, a closable flow path (for example valve 961 in FIG. 13) may be provided that links each circuit.

The multiple effect arrangement described above may have feed saltwater input to the first effect and concentrated solution circulated down to lower effects. This arrangement would be beneficial when the feed saltwater is warm as may be the case for saltwater produced in oil processes. Alternatively, the feed saltwater may be input to the final effect's saltwater circuit. In this arrangement the saltwater concentrated in the final effect would be circulated to the next upstream effect and so on until it is eventually discharged from the first effect. This arrangement may be beneficial when the feed saltwater is cool, as may be the case for reverse osmosis desalination plant brine discharge.

Freshwater produced in the dehumidification devices of the multiple effect system is collected and may be removed from the system or utilized as a clean-in-place solution as described above with reference to FIG. 13. The freshwater produced in the first effect is warmer than subsequent effects and heat exchangers may be used to exchange heat between the warm condensed freshwater from upper effects to preheat the saltwater being fed into the system. This will beneficially reduce the net thermal energy input requirement.

While particular embodiments have been described in the foregoing, it is to be understood that other embodiments are possible and are intended to be included herein. It will be clear to any person skilled in the art that modification of and adjustments to the foregoing embodiments, not shown, are possible.

The invention claimed is:

1. A system for concentrating a solution comprising:
a first solution concentrating circuit comprising: a first humidification device comprising a first humidification media; a first dehumidification device in gas flow communication with the first humidification device; a first solution flow path for flow of a first solution to be concentrated to the first humidification device; the first humidification media facilitating evaporation of liquid from the first solution to be concentrated to a first gas as the first solution to be concentrated passes through the first humidification media thereby concentrating the first solution and producing a first humidified gas;
a second solution concentrating circuit comprising: a second solution container; a second humidification device comprising a second humidification media; a second solution flow path for flow of a second solution to be concentrated to the second humidification device; the second humidification media facilitating evaporation of liquid from the second solution to be concentrated to a second gas as the second solution to be concentrated passes through the second humidification media thereby concentrating the second solution and producing a second humidified gas; and
wherein the first dehumidification device comprises a condensing heat exchanger in the second solution flow path such that the second solution to be concentrated passes internal the condensing heat exchanger and is heated by heat generated from condensation of vapour from the first humidified gas on the external surface of the condensing heat exchanger, the condensing heat exchanger heating the second solution to be concentrated before the second solution to be concentrated enters the second humidification device.

2. The system of claim 1, further comprising a first duct connecting a first gas outlet from the first dehumidification device with a first gas inlet into the first humidification device.

3. The system of claim 2, wherein the first duct comprises a first closable outlet vent for controlled release of the first dehumidified gas from the first duct as required and a first closable inlet vent for controlled input of external gas into the first duct as required.

4. The system of claim 3, wherein the first duct further comprises a first internal closable return vent for controlled recirculation of the first dehumidified gas through the first duct as required and a first internal closable inlet vent for controlled introduction of the first dehumidified gas into the first humidification device as required.

5. The system of claim 1, further comprising a second dehumidification device in gas flow communication with the second humidification device, such that the second humidified gas flows from the second humidification device to the second dehumidification device, wherein the second dehumidification device is operable to condense vapour from the second humidified gas.

6. The system of claim 5, further comprising a heat recovery circuit comprising a heat recovery evaporator, a heat recovery compressor, a heat recovery condenser and a heat recovery expansion device, wherein the second dehumidification device comprises the heat recovery evaporator configured such that heat generated from condensation of vapour from the second humidified gas is transferred to a heat recovery refrigerant within the heat recovery evaporator to evaporate the heat recovery refrigerant, the heat recovery compressor is configured to compress the evaporated heat recovery refrigerant, the heat recovery condenser is configured to condense the compressed heat recovery refrigerant and transfer the heat of condensation of the heat recovery refrigerant to the first solution to be concentrated before the first solution to be concentrated enters the first humidification device, and the heat recovery expansion device is configured to expand the compressed heat recovery refrigerant before the heat recovery refrigerant enters the heat recovery evaporator.

7. The system of claim 4, further comprising a second duct connecting a second gas outlet from the second dehumidification device with a second gas inlet into the second humidification device.

8. The system of claim 7, wherein the second duct comprises a second closable outlet vent for controlled release of the second dehumidified gas from the second duct as required and a second closable inlet vent for controlled input of external gas into the second duct as required.

9. The system of claim 8, wherein the second duct further comprises a second internal closable return vent for controlled recirculation of the second dehumidified gas through the second duct as required and a second internal closable inlet vent for controlled introduction of the second dehumidified gas into the second humidification device as required.

10. The system of claim 1 further comprising a cleaning circuit comprising:
 a cleaning solution container for cleaning solution;
 a closable first outlet flow path fluidly connecting the cleaning solution container with the first solution flow path, for controllable flow of cleaning solution from the cleaning solution container through at least part of the first solution flow path; and
 a closable second outlet flow path fluidly connecting the cleaning solution container with the second solution flow path, for controllable flow of cleaning solution from the cleaning solution container through at least part of the second solution flow path.

11. The system of claim 10, wherein the first and second outlet flow paths are closable by a one way valve.

12. The system of claim 10, wherein the cleaning circuit further comprises a closable first return flow path fluidly connecting the first solution flow path with the cleaning solution container for return flow of cleaning solution to the cleaning solution container, and/or a closable second return flow path fluidly connecting the second solution flow path with the cleaning solution container for return flow of cleaning solution to the cleaning solution container.

13. The system of claim 12, wherein the first return flow path and/or the second return flow path are closable by a one way valve.

14. The system of claim 10, wherein the cleaning circuit further comprises a heater for heating the cleaning solution.

15. The system of claim 10, further comprising one or more sensors for sensing process conditions that indicate a build up of solids in at least one of the first solution flow path or the second solution flow path to provide an indication that the cleaning circuit needs to be activated.

16. The system of claim 1, further comprising one or more additional solution concentrating circuits positioned between the first and second solution concentrating circuits such that solution to be concentrated in an additional circuit is heated in a condensing heat exchanger of a dehumidification device of an upstream solution concentrating circuit before the solution to be concentrated enters a humidification device in the additional circuit.

17. A system for concentrating a solution comprising:
 a humidification device comprising humidification media;
 a solution flow path for flow of a solution to be concentrated to the humidification device, the humidification media facilitating evaporation of liquid from the solution to be concentrated to gas as the solution to be concentrated passes through the humidification media thereby concentrating the solution;
 a dehumidification device in gas flow communication with the humidification device such that humidified gas flows from the humidification device to the dehumidification device, the dehumidification device operable to condense vapour from the humidified gas;
 a heat recovery circuit comprising a heat recovery evaporator, a heat recovery compressor, a heat recovery condenser, and heat recovery expansion device,
 wherein the dehumidification device comprises the heat recovery evaporator configured to transfer heat generated by condensing vapour from the humidified gas to a heat recovery refrigerant within the heat recovery evaporator such that the heat recovery refrigerant evaporates, the heat recovery compressor is configured to compress the evaporated heat recovery refrigerant, the heat recovery condenser is configured to condense the compressed heat recovery refrigerant and transfer the heat of condensation of the heat recovery refrigerant to the solution to be concentrated before the solution to be concentrated enters the humidification device, and the heat recovery expansion device is configured to expand the compressed heat recovery refrigerant before the heat recovery refrigerant enters the heat recovery evaporator.

18. The system of claim 17, further comprising a duct connecting a gas outlet from the dehumidification device with a gas inlet into the humidification device.

19. The system of claim 18, wherein the duct includes a closable outlet vent for controlled release of dehumidified gas from the duct as required and a closable inlet vent for controlled input of external gas into the duct as required.

20. The system of claim 19, wherein the duct further comprises an internal closable return vent for controlled recirculation of the dehumidified gas through the duct as required and an internal closable inlet vent for controlled introduction of the dehumidified gas into the humidification device as required.

21. The system of claim 17 further comprising a cleaning circuit comprising:
 a cleaning solution container for cleaning solution; and
 a closable outlet flow path fluidly connecting the cleaning solution container with the solution flow path, for controllable flow of cleaning solution from the cleaning solution container through at least part of the solution flow path.

22. The system of claim 21, wherein the outlet flow path is closable by a one way valve.

23. The system of claim 21, wherein the cleaning circuit further comprises a closable return flow path fluidly connecting the solution flow path with the cleaning solution container for return flow of cleaning solution to the cleaning solution container.

24. The system of claim 23, wherein the return flow path is closable by a one way valve.

25. The system of claim 21, wherein the cleaning circuit further comprises a heater for heating the cleaning solution.

26. The system of claim 21, further comprising one or more sensors for sensing process conditions of the system that indicate a build up of solids in the solution flow path to provide an indication that the cleaning circuit needs to be activated.

27. A system for concentrating a solution comprising:
a humidification device comprising humidification media;
a solution flow path for flow of a solution to be concentrated to the humidification device, the humidification media facilitating evaporation of liquid from the solution to be concentrated to gas as the solution to be concentrated passes through the humidification media thereby concentrating the solution;
a dehumidification device in gas flow communication with the humidification device such that humidified gas flows from the humidification device to the dehumidification device, the dehumidification device operable to condense vapour from the humidified gas; and
a duct connecting a gas outlet from the dehumidification device with a gas inlet into the humidification device, the duct comprising a closable outlet vent for controlled release of dehumidified gas from the duct as required and a closable inlet vent for controlled input of external gas into the duct as required.

28. The system of claim 27, wherein the duct further comprises an internal closable return vent for controlled recirculation of the dehumidified gas through the duct as required and an internal closable inlet vent for controlled introduction of the dehumidified gas into the humidification device as required.

* * * * *